United States Patent
Li et al.

(10) Patent No.: US 11,368,347 B2
(45) Date of Patent: Jun. 21, 2022

(54) CHANNEL PROBING SIGNAL FOR A BROADBAND COMMUNICATION SYSTEM

(71) Applicant: NEO WIRELESS LLC, Wayne, PA (US)

(72) Inventors: Xiaodong Li, Kirkland, WA (US); Titus Lo, Bellevue, WA (US); Kemin Li, Bellevue, WA (US); Haiming Huang, Bellevue, WA (US)

(73) Assignee: NEO WIRELESS LLC, Wayne, PA (US)

( * ) Notice: Subject to any disclaimer, the term of this patent is extended or adjusted under 35 U.S.C. 154(b) by 0 days.

(21) Appl. No.: 17/092,786

(22) Filed: Nov. 9, 2020

(65) Prior Publication Data
US 2021/0058281 A1 Feb. 25, 2021

Related U.S. Application Data

(63) Continuation of application No. 16/902,740, filed on Jun. 16, 2020, now Pat. No. 10,833,908, and a
(Continued)

(51) Int. Cl.
*H04L 27/26* (2006.01)
*H04L 5/00* (2006.01)
(Continued)

(52) U.S. Cl.
CPC ......... *H04L 27/2626* (2013.01); *H04B 1/707* (2013.01); *H04B 1/711* (2013.01);
(Continued)

(58) Field of Classification Search
CPC ............. H04W 72/04; H04W 72/0413; H04W 72/0453; H04W 72/0466; H04W 72/1268;
(Continued)

(56) References Cited

U.S. PATENT DOCUMENTS

| 5,825,807 A | 10/1998 | Kumar |
| 5,828,650 A | 10/1998 | Malkamaki et al. |

(Continued)

FOREIGN PATENT DOCUMENTS

| CN | 1407745 | 4/2003 |
| CN | 1445949 | 10/2003 |

(Continued)

OTHER PUBLICATIONS

European Telecommunications Standards Institute, Digital Video Broadcasting (DVB); Framing structure, channel coding and modulation for digital terrestrial television, ETSI EN 300 744 V1.5.1 (Jun. 2004).

(Continued)

*Primary Examiner* — Jason E Mattis
(74) *Attorney, Agent, or Firm* — Volpe Koenig

(57) ABSTRACT

In a broadband wireless communication system, a spread spectrum signal is intentionally overlapped with an OFDM signal, in a time domain, a frequency domain, or both. The OFDM signal, which inherently has a high spectral efficiency, is used for carrying broadband data or control information. The spread spectrum signal, which is designed to have a high spread gain for overcoming severe interference, is used for facilitating system functions such as initial random access, channel probing, or short messaging. Methods and techniques are devised to ensure that the mutual interference between the overlapped signals is minimized to have insignificant impact on either signal and that both signals are detectable with expected performance by a receiver.

100 Claims, 18 Drawing Sheets

Related U.S. Application Data continuation of application No. 16/908,067, filed on Jun. 22, 2020, now Pat. No. 10,826,740, said application No. 16/902,740 is a continuation of application No. 15/953,950, filed on Apr. 16, 2018, now Pat. No. 10,771,302, said application No. 16/908,067 is a continuation of application No. 15/953,950, filed on Apr. 16, 2018, now Pat. No. 10,771,302, which is a continuation of application No. 14/321,615, filed on Jul. 1, 2014, now Pat. No. 9,948,488, which is a continuation of application No. 13/861,942, filed on Apr. 12, 2013, now Pat. No. 8,767,522, which is a continuation of application No. 13/347,644, filed on Jan. 10, 2012, now Pat. No. 8,428,009, which is a continuation of application No. 12/975,226, filed on Dec. 21, 2010, now Pat. No. 8,094,611, which is a continuation of application No. 10/583,229, filed as application No. PCT/US2005/003518 on Jan. 27, 2005, now Pat. No. 7,864,725.

(60) Provisional application No. 60/540,586, filed on Jan. 30, 2004, provisional application No. 60/540,032, filed on Jan. 29, 2004.

(51) Int. Cl.
  *H04L 25/03* (2006.01)
  *H04L 27/00* (2006.01)
  *H04B 1/707* (2011.01)
  *H04B 1/711* (2011.01)
  *H04L 25/02* (2006.01)

(52) U.S. Cl.
  CPC .......... *H04L 5/0007* (2013.01); *H04L 5/0028* (2013.01); *H04L 25/03834* (2013.01); *H04L 27/0008* (2013.01); *H04L 27/0012* (2013.01); *H04L 27/2602* (2013.01); *H04L 27/2647* (2013.01); *H04L 5/0016* (2013.01); *H04L 25/0228* (2013.01); *H04L 27/2607* (2013.01); *H04L 27/2655* (2013.01)

(58) Field of Classification Search
  CPC ....... H04W 88/06; H04W 88/10; H04W 8/18; H04W 74/02; H04W 76/02; H04W 27/2626
  USPC .......... 370/310, 328, 329, 345, 347
  See application file for complete search history.

(56) References Cited

U.S. PATENT DOCUMENTS

| | | | |
|---|---|---|---|
| 5,867,478 A | 2/1999 | Baum et al. | |
| 5,898,338 A | 4/1999 | Proctor et al. | |
| 5,909,436 A | 6/1999 | Engstrom et al. | |
| 5,929,704 A | 7/1999 | Proctor et al. | |
| 6,078,216 A | 6/2000 | Proctor | |
| 6,101,179 A | 8/2000 | Soliman | |
| 6,141,546 A | 10/2000 | Thomas | |
| 6,175,550 B1 | 1/2001 | van Nee | |
| 6,188,717 B1 * | 2/2001 | Kaiser | H04L 25/0224 375/148 |
| 6,434,364 B1 | 8/2002 | O'Riordain | |
| 6,480,558 B1 | 11/2002 | Ottosson et al. | |
| 6,515,960 B1 | 2/2003 | Usui et al. | |
| 6,567,383 B1 | 5/2003 | Bohnke | |
| 6,600,772 B1 | 7/2003 | Zeira et al. | |
| 6,643,281 B1 | 11/2003 | Ryan | |
| 6,731,673 B1 | 5/2004 | Kotov et al. | |
| 6,741,578 B1 | 5/2004 | Moon et al. | |
| 6,771,706 B2 | 8/2004 | Ling et al. | |
| 6,839,876 B1 | 1/2005 | Tong et al. | |
| 6,847,678 B2 | 1/2005 | Berezdivin et al. | |
| 6,882,619 B1 * | 4/2005 | Gerakoulis | H04B 7/12 370/209 |
| 6,922,388 B1 | 7/2005 | Laroia et al. | |
| 6,940,827 B2 | 9/2005 | Li et al. | |
| 7,035,663 B1 | 4/2006 | Linebarger et al. | |
| 7,039,001 B2 | 5/2006 | Krishnan et al. | |
| 7,062,002 B1 | 6/2006 | Michel et al. | |
| 7,123,934 B1 | 10/2006 | Linebarger et al. | |
| 7,133,352 B1 * | 11/2006 | Hadad | H04B 7/12 370/208 |
| 7,149,239 B2 | 12/2006 | Hudson | |
| 7,161,985 B2 | 1/2007 | Dostert et al. | |
| 7,161,987 B2 | 1/2007 | Webster et al. | |
| 7,218,666 B2 | 5/2007 | Baum et al. | |
| 7,260,054 B2 | 8/2007 | Olszewski | |
| 7,263,058 B2 | 8/2007 | Joo | |
| 7,274,652 B1 | 9/2007 | Webster et al. | |
| 7,317,931 B2 | 1/2008 | Guo | |
| 7,324,434 B2 * | 1/2008 | Sawahashi | H04B 1/692 370/208 |
| 7,342,974 B2 | 3/2008 | Chiou | |
| 7,366,200 B2 * | 4/2008 | Laroia | H04W 52/34 370/478 |
| 7,386,055 B2 | 6/2008 | Morita et al. | |
| 7,403,556 B2 | 7/2008 | Kao et al. | |
| 7,411,897 B2 | 8/2008 | Yoo et al. | |
| 7,418,042 B2 | 8/2008 | Choi et al. | |
| 7,420,915 B2 * | 9/2008 | Murakami | H04B 1/692 370/204 |
| 7,433,339 B2 * | 10/2008 | Kaipainen | H04B 7/0619 370/334 |
| 7,443,829 B2 | 10/2008 | Rizvi et al. | |
| 7,471,667 B2 | 12/2008 | Hirsch et al. | |
| 7,548,506 B2 | 6/2009 | Ma et al. | |
| 7,555,268 B2 | 6/2009 | Trachewsky et al. | |
| 7,567,624 B1 | 7/2009 | Schmidl et al. | |
| 7,639,660 B2 * | 12/2009 | Kim | H04L 1/005 370/208 |
| 7,646,747 B2 | 1/2010 | Atarashi et al. | |
| 7,650,152 B2 | 1/2010 | Li et al. | |
| 7,693,032 B2 | 4/2010 | Li et al. | |
| 7,724,720 B2 | 5/2010 | Korpela et al. | |
| 7,738,437 B2 | 6/2010 | Ma et al. | |
| 7,864,725 B2 * | 1/2011 | Li | H04L 27/0012 370/328 |
| 7,873,009 B2 | 1/2011 | Larsson et al. | |
| 7,876,716 B2 * | 1/2011 | Sudo | H04W 52/143 370/280 |
| 7,907,592 B2 | 3/2011 | Han et al. | |
| 8,009,660 B2 | 8/2011 | Li et al. | |
| 8,089,887 B2 | 1/2012 | Lippman et al. | |
| 8,094,611 B2 | 1/2012 | Li et al. | |
| 8,102,832 B2 | 1/2012 | Agrawal et al. | |
| 8,199,632 B2 | 6/2012 | Geile et al. | |
| 8,320,301 B2 * | 11/2012 | Walton | H04L 27/2647 370/328 |
| 8,363,691 B2 | 1/2013 | Hasegawa et al. | |
| 8,428,009 B2 | 4/2013 | Li et al. | |
| 8,432,891 B2 | 4/2013 | Li et al. | |
| 8,467,366 B2 | 6/2013 | Li et al. | |
| 8,767,522 B2 | 7/2014 | Li et al. | |
| 10,638,468 B2 | 4/2020 | Nelson et al. | |
| 2001/0021182 A1 | 9/2001 | Wakutsu | |
| 2002/0141483 A1 | 10/2002 | Doetsch et al. | |
| 2002/0159422 A1 | 10/2002 | Li et al. | |
| 2003/0072255 A1 | 4/2003 | Ma et al. | |
| 2003/0081538 A1 | 5/2003 | Walton et al. | |
| 2003/0179776 A1 | 9/2003 | Sumasu et al. | |
| 2004/0001429 A1 | 1/2004 | Ma et al. | |
| 2004/0082356 A1 | 4/2004 | Walton et al. | |
| 2004/0085946 A1 | 5/2004 | Morita et al. | |
| 2004/0109432 A1 | 6/2004 | Laroia et al. | |
| 2004/0114504 A1 | 6/2004 | Jung et al. | |
| 2004/0160921 A1 | 8/2004 | Kaipainen et al. | |
| 2004/0171357 A1 | 9/2004 | Lobinger | |
| 2004/0190598 A1 | 9/2004 | Seki et al. | |
| 2004/0228267 A1 | 11/2004 | Agrawal et al. | |

(56) References Cited

U.S. PATENT DOCUMENTS

| | | |
|---|---|---|
| 2004/0264600 A1 | 12/2004 | Kao et al. |
| 2005/0111397 A1 | 5/2005 | Attar et al. |
| 2006/0114815 A1 | 6/2006 | Hasegawa |
| 2006/0245409 A1 | 11/2006 | Korpela |
| 2008/0304551 A1 | 12/2008 | Li et al. |
| 2011/0211617 A1 | 9/2011 | Li et al. |
| 2011/0299474 A1 | 12/2011 | Li et al. |
| 2012/0106513 A1 | 5/2012 | Li et al. |
| 2013/0242937 A1 | 9/2013 | Li et al. |

FOREIGN PATENT DOCUMENTS

| | | |
|---|---|---|
| CN | 1452326 | 10/2003 |
| EP | 1650891 | 4/2006 |
| JP | 09-233047 | 9/1997 |
| JP | 10-210002 | 8/1998 |
| KR | 2001-0083789 | 9/2001 |
| KR | 2003-0060892 | 7/2003 |
| KR | 2009-0040929 | 4/2009 |
| WO | 2000/035121 A1 | 6/2000 |
| WO | 2001/061880 A1 | 8/2001 |
| WO | 2003/058881 | 7/2003 |

OTHER PUBLICATIONS

Examination Report, European Application No. 05711777.2, dated Oct. 29, 2012, 6 pages.

Examination Report, European Application No. 05712825.8, dated Aug. 16, 2012, 6 pages.

Extended European Search Report received for counterpart European Patent Application No. 18196596.3, dated Feb. 20, 2019 (8 pages).

IEEE Standard for Local and metropolitan area networks; Part 16: Air Interface for Fixed Broadband Wireless Access Systems—Amendment 2: Medium Access Control Modifications and Additional Physical Layer Specifications for 2-11 GHz, IEEE Std. 802.16a-2003 (Apr. 1, 2003).

International Search Report and Written Opinion for International Application No. PCT/US05/01939, dated Apr. 26, 2005, 7 pages.

International Search Report and Written Opinion; International Patent Application No. PCT/US05/03518; Filed Jan. 27, 2005; Applicant: Waltical Solutions, Inc.; dated May 23, 2005; 8 pages.

Notice of Allowance, U.S. Appl. No. 13/347,644, dated Mar. 7, 2013, 17 pages.

Notice of Allowance, U.S. Appl. No. 13/861,942, dated May 16, 2014, 14 pages.

Supplementary European Search Report, European Application No. 05711777, dated May 7, 2012, 6 pages.

Supplementary European Search Report, European Application No. 05712825, dated Mar. 26, 2012, 4 pages.

Tufvesson et al. "OFDM Time and Frequency Synchronization by Spread Spectrum Pilot Technique," Communication Theory Mini-Conference, Vancouver, B.C., Canada, Jun. 6-10, 1999, pp. 115-119.

Hayes, "T1P1—Wireless/Mobile Services and Systems Technical Sub-Committee," IMT-2000 Radio Transmission Technology Candidate, T1P1.1/98-081R1 (Jun. 12, 1998).

Definition of "guard band," McGraw Hill Dictionary of Scientific and Technical Terms, 6th edition (2003).

ETSI Special Mobile Group (SMG) Report of UMTS 30.06 V3.0.0; Universal Mobile Telecommunications System (UMTS); UMTS Terrestrial Radio Acces (UTRA); Concept evaluation (UMTS 30.06 version 3.0.0), TR 101 146 V3.0.0 (Dec. 1997).

SKLAR, Digital Communications, Fundamentals and Applications, 2nd edition, Prentice Hall PTR, pp. 7-9 (2001).

Universal Mobile Telecommunications System (UMTS); UMTS Terrestrial Radio Acces (UTRA); Concept evaluation (UMTS 30.06 version 3.0.0), TR 101 146 V3.0.0 (Dec. 1997).

Baxley et al., "Power Savings Analysis of Peak-to-Average Power Ratio Reduction in OFDM," IEEE Transactions an Consumer Electronics, vol. 50, No. 3 (Aug. 2004).

Dell Inc. et al., v. Neo Wireless LLC, Declaration of Craig Bishop, Inter Partes Review of U.S. Pat. No. 8,467,366 and U.S. Pat. No. 10,833,908 (Sep. 2, 2021).

Dell Inc. et al., v. Neo Wireless LLC, Declaration of Dr. Matthew Valenti, Inter Partes Review of U.S. Pat. No. 10,833,908 (Dec. 6, 2021).

Dell Inc. et al., v. Neo Wireless LLC, Petition for Inter Partes Review of U.S. Pat. No. 10,833,908 pursuant to 35 U.S.C. §§ 311-319, 37 C.F.R. § 42 (Dec. 14, 2021).

Guo et al., "Adaptive Dynamic Range Companding," 2002 World Wireless Congress, San Francisco, CA (2002).

Koffman et al., "Broadband Wireless Access Solutions Based on OFDM Access in IEEE 802.16," IEEE Communications Magazine, pp. 96-103 (Apr. 2002).

Neo Wireless LLC v. Apple Inc., Apple Inc's Answer to Plaintiffs First Amended Complaint, Civil Action No. 6:21-cv-00026-ADA (Jun. 17, 2021).

Neo Wireless LLC v. Apple Inc., Plaintiffs First Amended Complaint, Civil Action No. 6:21-cv-0026 (Apr. 28, 2021).

Neo Wireless LLC v. Dell Technologies Inc et al., Declaration of Roger Fulgham in Support of Defendants' Opening Claim Construction, Civil Action No. 6:21-cv-0024 (Oct. 28, 2021).

Neo Wireless LLC v. Dell Technologies Inc et al., Declaration of James Proctor in Support of Defendants' Dpening Claim Construction Brief, Civil Action No. 6:21-cv-0024 (Oct. 27, 2021).

Neo Wireless LLC v. Dell Technologies Inc et al., Declaration of William Alberth in Support of Neo Wireless's Responsive Claim Construction Brief, Civil Action No. 6:21-cv-0024 (Nov. 18, 2021).

Neo Wireless LLC v. Dell Technologies Inc et al., Defendant's Answer, Affirmative Defenses, and Counterclaims to Plaintiffs First Amended Complaint, Civil Action No. 6:21-cv-0024 (Jun. 18, 2021).

Neo Wireless LLC v. Dell Technologies Inc et al., Defendants' Opening Claim Construction Brief, Civil Action No. 6:21-cv-0024 (Oct. 28, 2021).

Neo Wireless LLC v. Dell Technologies Inc et al., Defendants' Reply Claim Construction Brief, Civil Action No. 6:21-cv-0024 (Dec. 2, 2021).

Neo Wireless LLC v. Dell Technologies Inc et al., Joint Claim Construction Statement, Civil Action No. 3:21-cv-0024 (Dec. 21, 2021).

Neo Wireless LLC v. Dell Technologies Inc et al., Neo Wireless's Answer to Dell's Counterclaims, Civil Action No. 6:21-cv-0024 (Jul. 9, 2021).

Neo Wireless LLC v. Dell Technologies Inc et al., Plaintiff Neo Wireless LLC's Claim Construction Sur Reply Brief, Civil Action No. 6:21-cv-0024 (Dec. 16, 2021).

Neo Wireless LLC v. Dell Technologies Inc et al., Plaintiff Neo Wireless LLC's Responsive Claim Construction Brief, Civil Action No. 6:21-cv-0024 (Nov. 18, 2021).

Neo Wireless LLC v. Dell Technologies Inc et al., Stipulated Constructions, Civil Action No. 6:21-cv-0024 (Oct. 27, 2021).

Neo Wireless LLC v. Dell Technologies Inc et al., Supplemental Declaration of James Proctor in Support of Defendants' Reply Claim Construction Brief, Civil Action No. 6:21-cv-0024 (Dec. 2, 2021).

Neo Wireless LLC v. Dell Technologies Inc et al., Plaintiffs First Amended Complaint, Civil Action No. 3:21-cv-0024 (Apr. 28, 2021).

Neo Wireless LLC v. LG Electrincs Inc., Defendant LG's Answer to Plaintiffs First Amended Complaint, Civil Action No. 6:21-cv-00025-ADA (Jun. 17, 2021).

Neo Wireless LLC v. LG Electronics Inc., Plaintiffs First Amended Complaint, Civil Action No. 6:21-ov-0025 (Apr. 28, 2021).

Neo Wireless LLC, Claim Chart—Claim 11 of U.S. Pat. No. 10,833,908, submitted with Plaintiffs First Amended Complaint, Neo Wireless LLC v Dell, Inc et al., Civil Action No. 6:21-cv-0024 (Apr. 28, 2021).

Panta et al., "Use of Peak-to-Average Power Reduction Technique in HIPERLAN2 and its Performance in a Fading Channel." Proc. 6th International Symposium on DSP for Communication Systems, pp. 113-117, (2002).

(56) References Cited

OTHER PUBLICATIONS

Prasad, "Chapter 6—The Peak Power Problem," in OFDM for Wireless Communications Systems, Artech House (2004).
Proakis et al., Digital Signal Processing Principles, Algorithms, and Applications, pp. 5-16, Prentice Hall, 3rd edition (1996).
Van Nee et al., OFDM for Wireless Multimedia Communications, Artech House (2000).
You et al., "A Simple Construction of OFDM-CDMA Signals with Low Peak-to-Average Power Ratio," IEEE Transactions on Broadcasting, vol. 49, No. 4 (Dec. 2003).
*Neo Wireless LLC* v. *Ford Motor Company*, Plaintiff NEO Wireless LLC's Complaint for Patent Infringement, United States District Court for the Western District of Missouri Western Division, Case No. 4:22-cv-00210-GAF (Mar. 29, 2022).
*Neo Wireless LLC* v. *General Motors Company et al.*, Plaintiff NEO Wireless LLC's Complaint for Patent nfringement. United States District Court for the Eastern District of Texas Marshall Division, Case No. 2:22-cv-00094 (Mar. 29, 2022).
*Neo Wireless LLC* v. *American Honda Motor Co., Inc et al.*, Plaintiff NEO Wireless LLC's Complaint for Patent Infringement, United States District Court for the Southern District of Ohio Eastern Division at Columbus, Case No. 2:22-cv-01824-EAS-KAJ (Mar. 29, 2022).
*Neo Wireless LLC* v. *Nissan North America Inc et al.*, Plaintiff NEO Wireless LLC's Complaint for Patent nfringement, United States District Court for the Middle District of Tennessee Nashville Division, Case No. 3:22-cv-00220 (Mar. 29, 2022).
*Neo Wireless LLC* v. *Tesla Inc.*, Plaintiff NEO Wireless LLC's Complaint for Patent Infringement, United States District Court for the Eastern District of Texas Marshall Division, Case No. 2:22-cv-00095 (Mar. 29, 2022).
*Neo Wireless LLC* v. *Toyota Motor North America, Inc et al.*, Plaintiff NEO Wireless LLC's Complaint for Patent Infringement, United States District Court for the Eastern District of Texas Marshall Division, Case No. 2:22-cv-00093 (Mar. 29, 2022).
*Neo Wireless LLC* v. *Volkswagen Group of America, Inc., et al.*, Plaintiff NEO Wireless LLC's Complaint for Patent Infringement, United States District Court for the Eastern District of Tennessee Chattanooga District, Case No. 1:22-cv-00076 (Mar. 29, 2022).

\* cited by examiner

CHANNEL PROBING SIGNAL FOR A BROADBAND COMMUNICATION SYSTEM

CROSS-REFERENCE TO RELATED APPLICATION(S)

This application is continuation of U.S. patent application Ser. No. 16/902,740, filed Jun. 16, 2020, and is a continuation of U.S. patent application Ser. No. 16/908,067, filed Jun. 22, 2020, which issued on Nov. 3, 2020 as U.S. Pat. No. 10,826,740, which are continuations of U.S. patent application Ser. No. 15/953,950, filed Apr. 16, 2018, which issued on Sep. 8, 2020 as U.S. Pat. No. 10,771,302, which is continuation of U.S. patent application Ser. No. 14/321,615, filed Jul. 1, 2014, which issued on Apr. 17, 2018 as U.S. Pat. No. 9,948,488, which is a continuation application of U.S. patent application Ser. No. 13/861,942, filed Apr. 12, 2013, which issued on Jul. 1, 2014 as U.S. Pat. No. 8,767,522, which is a continuation application of U.S. patent application Ser. No. 13/347,644, filed Jan. 10, 2012, which issued on Apr. 23, 2013 as U.S. Pat. No. 8,428,009, which is a continuation application of U.S. patent application Ser. No. 12/975,226, filed Dec. 21, 2010, which issued on Jan. 10, 2012 as U.S. Pat. No. 8,094,611, which is a continuation of U.S. patent application Ser. No. 10/583,229, filed Aug. 27, 2008, which issued on Jan. 4, 2011 as U.S. Pat. No. 7,864,725, which is the National Stage Application of International Application No. PCT/US2005/003518, filed Jan. 27, 2005, which claims the benefit of U.S. Provisional Patent Application No. 60/540,586, filed on Jan. 30, 2004, and of U.S. Provisional Patent Application No. 60/540,032, filed on Jan. 29, 2004, which is/are incorporated by reference as if fully set forth.

BACKGROUND

A direct Sequence Spread Spectrum (DSSS) system is inherently capable of supporting multi-cell and multi-user access applications through the use of orthogonal spreading codes. The initial access of the physical channel and frequency planning are relatively easier because of interference averaging in a DSSS system. It has been widely used in some existing wireless networks. However, a DSSS system using orthogonal spreading codes, may suffer severely from the loss of orthogonally in a broadband environment due to multi-path propagation effects, which results in low spectral efficiency.

In broadband wireless communications, Multi-Carrier (MC) technology is drawing more and more attention because of its capability. An MC system such as an Orthogonal Frequency Division Multiplexing (OFDM) system is capable of supporting broadband applications with higher spectral efficiency. An MC system mitigates the adverse effects of multi-path propagation in wireless environments by using cyclic prefixes to extend the signal period as the data is multiplexed on orthogonal sub-carriers. In effect, it converts a frequency selective channel into a number of parallel flat fading channels which can be easily equalized with simple one-tap equalizers. The modulator and the demodulator can be executed efficiently via the fast Fourier transform (FFT) with much lower cost. However, MC systems are vulnerable while operating in multi-user and multi-cell environments.

DETAILED DESCRIPTION

Figure 1:
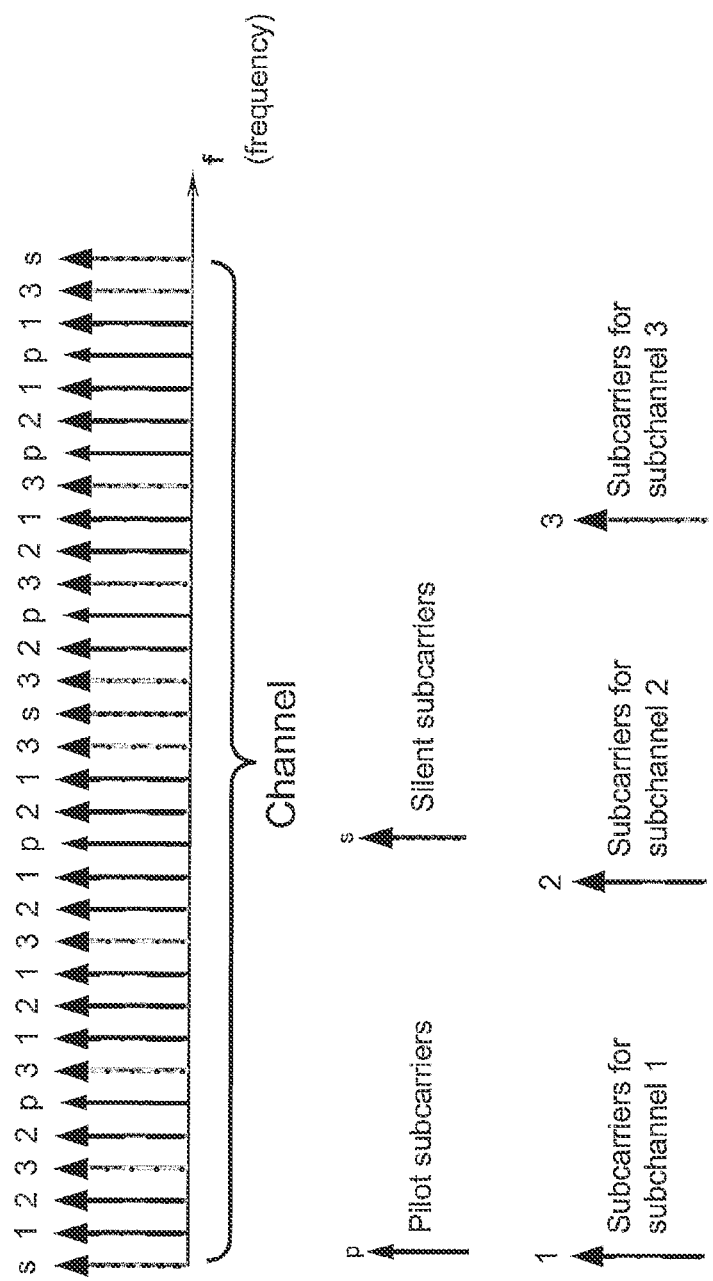
FIG. 1 illustrates a basic structure of a multi-carrier signal in the frequency domain, made up of subcarriers.

A broadband wireless communication system where both the Multi-Carrier (MC) and direct Sequence Spread Spectrum (DSSS) signals are intentionally overlaid together in both time and frequency domains is described. The system takes advantage of both MC and DSSS techniques to mitigate their weaknesses. The MC signal is used to carry broadband data signal for its high spectral efficiency, while the DSSS signal is used for special purpose processing, such as initial random access, channel probing, and short messaging, in which signal properties such as simplicity, self synchronization, and performance under severe interference are of concern. In the embodiments of this invention both the MC and the DSSS signals are distinguishable in normal operations and the interference between the overlaid signals is insufficient to degrade the expected performance of either signal.

Unlike a typical CDMA system where the signals are designed to be orthogonal in the code domain or an OFDM system where the signals are designed to be orthogonal in frequency domain, the embodiments of this invention overlay the MC signal, which is transmitted without or with very low spreading, and the DSSS signal, which is transmitted at a power level lower than that of the MC signal.

In accordance with aspects of certain embodiments of this invention, the MC signal is modulated on subcarriers in the frequency domain while the DSSS signal is modulated by the information bits or symbols in the time domain. In some cases the information bits modulating the DSSS sequence are always one.

This invention further provides apparatus and means to implement the mentioned processes and methods in a broadband wireless multi-access and/or multi-cell network, using advanced techniques such as transmit power control, spreading signal design, and iterative cancellation.

The mentioned MC system can be of any special format such as OFDM or Multi-Carrier Code Division Multiple Access (MC-CDMA). The presented methods and apparatus can be applied to downlink, uplink, or both, where the duplexing technique can be either Time Division Duplexing (TDD) or Frequency Division Duplexing (FDD).

Various embodiments of the invention are described to provide specific details for thorough understanding and enablement; however, the aspects of the invention may be practiced without such details. In some instances, well-known structures and functions have not been shown or described in detail to avoid unnecessarily obscuring the essential matters.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list.

Multi-Carrier Communication System

The physical media resource (e.g., radio or cable) in a multi-carrier communication system can be divided in both the frequency and time domains. This canonical division provides a high flexibility and fine granularity for resource sharing.

The basic structure of a multi-carrier signal in the frequency domain is made up of subcarriers. Within a particular spectral band or channel, there are a fixed number of subcarriers. There are three types of subcarriers:
1. Data subcarriers, which contain information data;
2. Pilot subcarriers, whose phases and amplitudes are predetermined and made known to all receivers and which are employed for assisting system functions such as estimation of system parameters; and
3. Silent subcarriers, which have no energy and are used for guard bands and DC carrier.

FIG. 1 illustrates a basic structure of a multi-carrier signal in the frequency domain, made up of subcarriers. The data subcarriers can be arranged into groups called subchannels to support scalability and multiple-access. The carriers forming one subchannel are not necessarily adjacent to each other. As depicted in FIG. 1, each user may use part or all of the subchannels.

Figure 2:
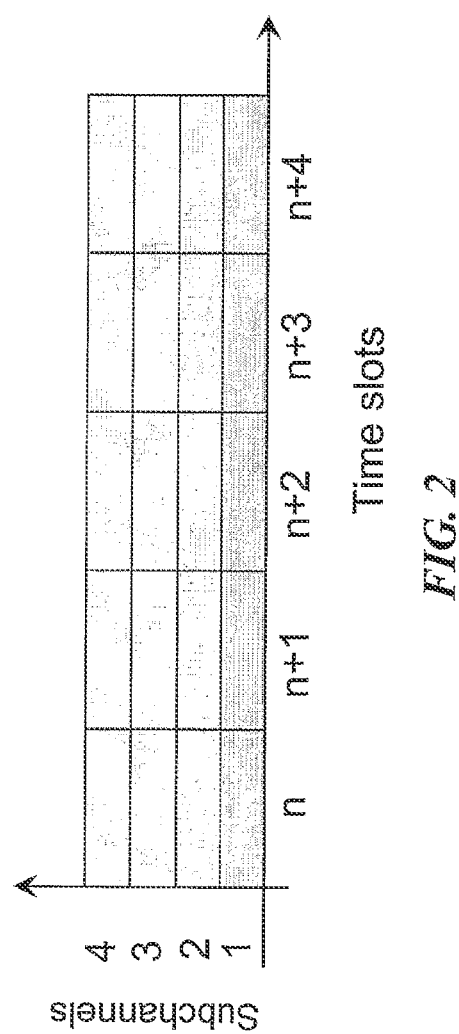
FIG. 2 illustrates a radio resource being divided into small units in both frequency and time domains.

FIG. 2 illustrates a radio resource being divided into small units in both frequency (subchannels) and time domains (time slots). The basic structure of an MC signal in the time domain is made up of time slots to support multiple-access.

An Exemplary MC System

Figure 3:
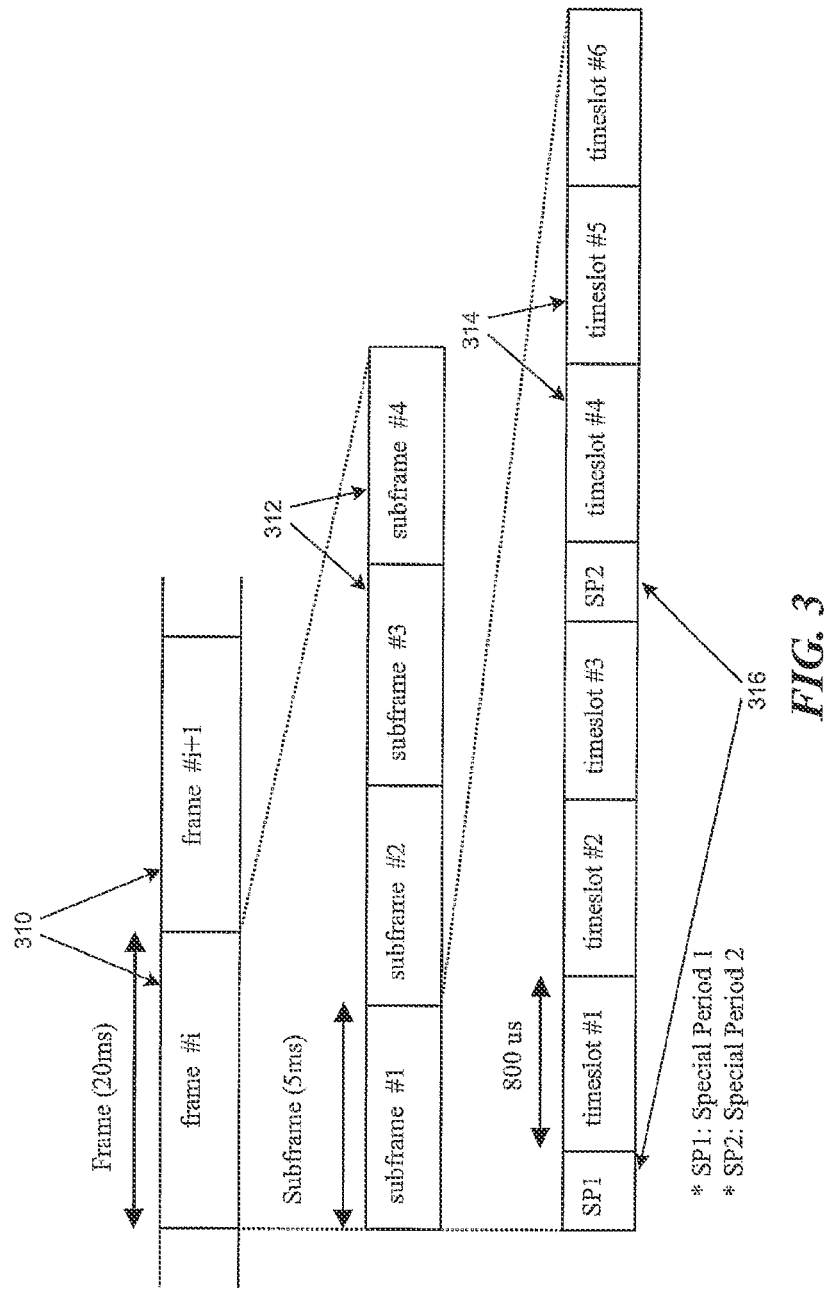
FIG. 3 illustrates a frame structure of an exemplary OFDM system.

An OFDM system is used in the system as a special case of an MC system. The system parameters for the uplink under consideration are listed in Table 1. FIG. 3 illustrates a frame structure of a suitable OFDM system. In this system, a 20 ms frame 310 is divided into four 5 ms subframes 312. One subframe 312 consists of six time slots 314 and two special periods 316, which serve transition time from downlink to uplink and vise versa. The six time slots in one subframe can be configured as either uplink or downlink slots symmetrically or asymmetrically.

Figure 4:
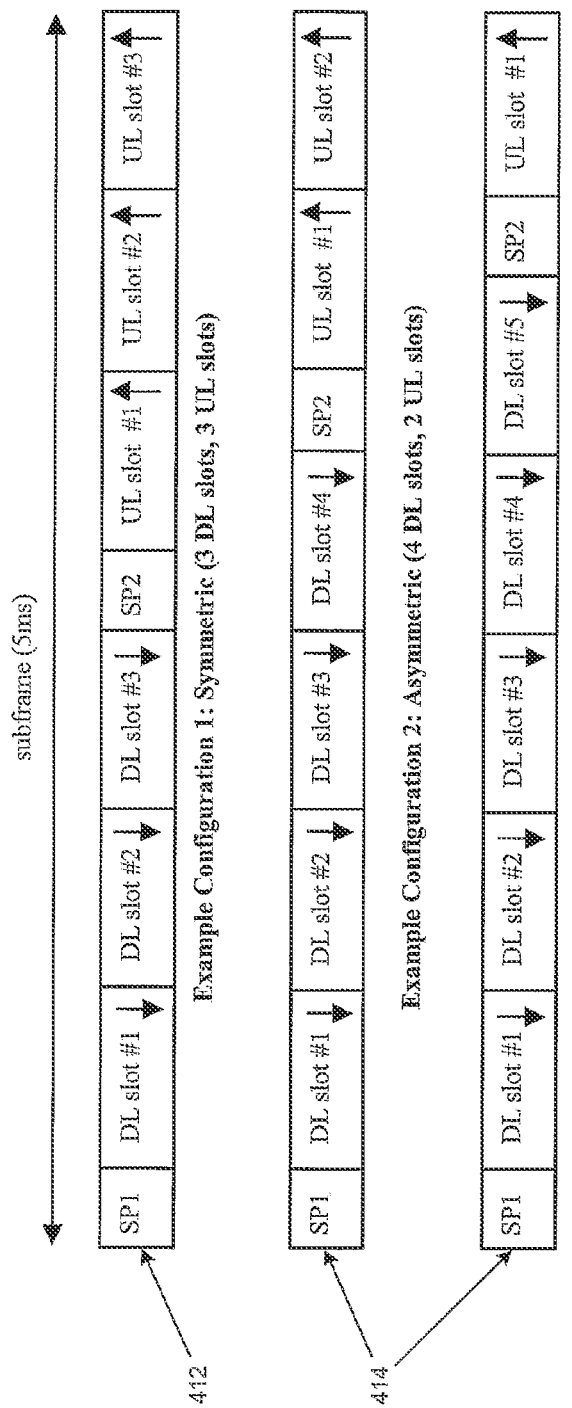
FIG. 4 illustrates three examples of a subframe structure in the exemplary OFDM system.
Figure 5:
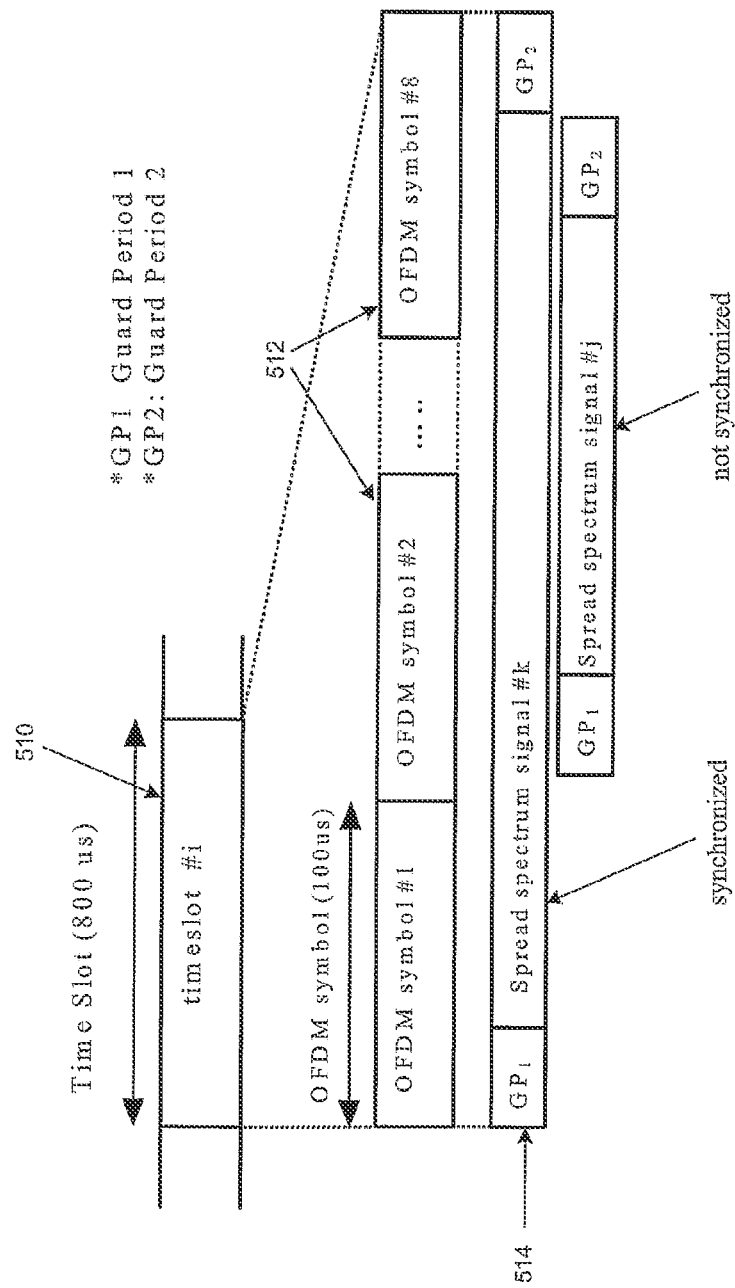
FIG. 5 illustrates slot structure of the OFDM system and the overlay system.

FIG. 4 illustrates three examples of a subframe structure in an OFDM system: one symmetric configuration 412 and two asymmetric configurations 414, each with differing number of uplink (UL) and downlink (DL) slots. FIG. 5 illustrates a slot structure of an OFDM system and an overlay system. One 800 μs time slot 510 is comprised of 8 OFDM symbols 512, which are overlaid by DSSS signals 514 in the time domain. Two guard periods GP1 and GP2 are allocated for the DSSS signal 514.

TABLE 1

| Uplink system parameters | |
| --- | --- |
| Data Rate | 2, 4, 8, 16, 24 Mbps |
| Modulation | QPSK, 16-QAM |
| Coding rate | 1/8, 1/4, 1/2, 3/4 |
| IFFT/FFT size | 1024 |
| OFDM symbol duration | 100 us |
| Guard interval | 11.11 us |
| Subcarrier spacing | 9.765625 kHz |
| System sampling rate (fs) | 11.52 MHz |
| Channel spacing | 10 MHz |

Detailed Description of a MC and DSSS Overlay System

FIG. 5 illustrates the overlay of the MC and DSSS signals, where the DSSS signal overlaps with the MC signal in the time domain. The overlaid signal can be aligned at the boundary of MC slot or MC symbol when they are synchronized (for example, DSSS signal #k in FIG. 5). It can also be not aligned when they are not synchronized (for example, DSSS signal #j in FIG. 5). In one embodiment, the DSSS signal is placed at the period of cyclic prefix of the OFDM symbol.

Figure 6:
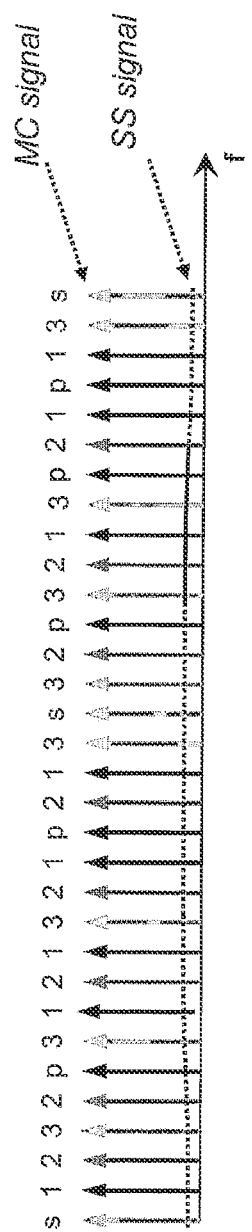
FIG. 6 is an illustration of MC signals overlaid with DSSS signals in the frequency domain where the power level of the DSSS signal is much lower than that of the MC signal.
Figure 7:
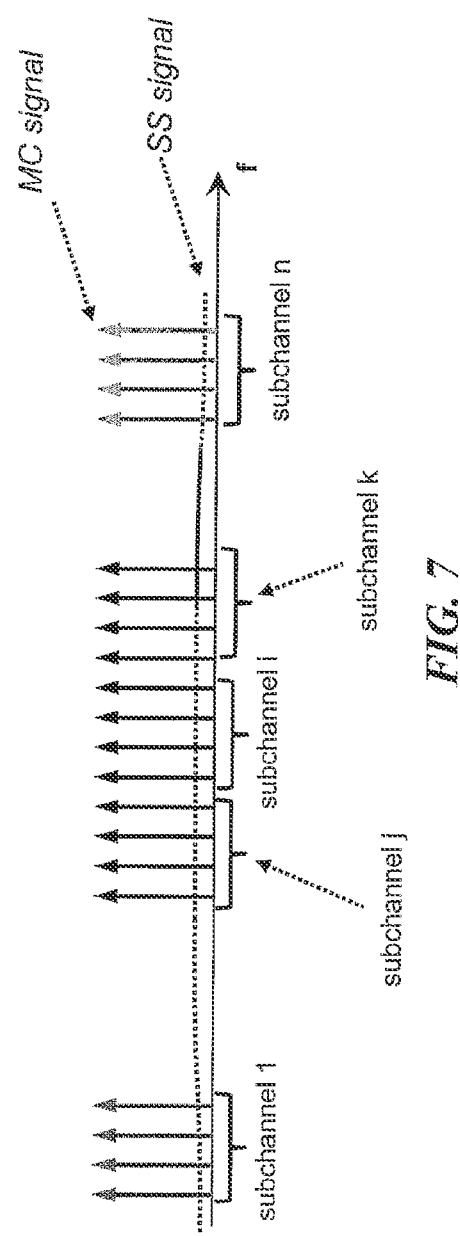
FIG. 7 is same as FIG. 6 wherein not all MC subchannels are occupied.

FIG. 6 is an illustration of MC signals overlaid with DSSS signals in the frequency domain where the power level of the DSSS signal is much lower than that of the MC signal. The subcarriers in a subchannel are not necessarily adjacent to each other in the frequency domain. FIG. 7 is similar to FIG. 6 wherein not all MC subchannels are occupied. It illustrates a scenario where some MC subchannels are not energized.

In another embodiment, the MC signal is modulated on subcarriers in the frequency domain while the DSSS signal is modulated in either the time domain or the frequency domain. In one embodiment the modulation symbol on the DSSS sequence is one and the sequence is unmodulated.

Figure 8:
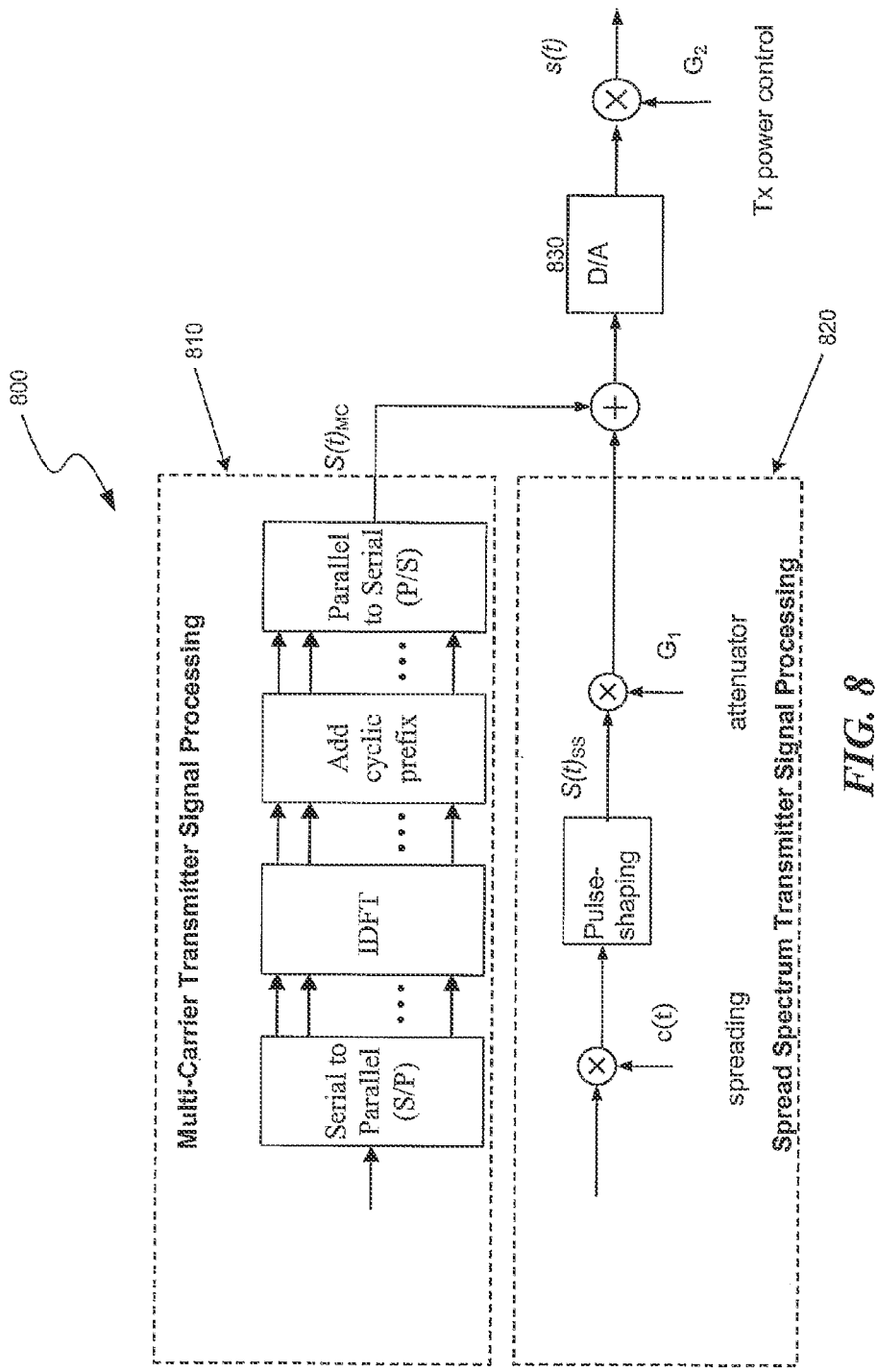
FIG. 8 illustrates a transmitter structure of MC and DSSS overlay system.

FIG. 8 illustrates a transmitter structure 800 of an MC and DSSS overlay system, wherein the MC signal and DSSS signal are added together prior to Digital to Analog (D/A)

conversion 830. In FIG. 8, the top branch 810 is an OFDM transmitter and the bottom branch 820 is the spread spectrum transmitter. In the MC transmitter, the S/P buffer converts the sequential inputs into parallel outputs, which are in turn inputted to the inverse discrete Fourier transform (IDFT). The outputs from the IDFT are the time domain signals, which are converted from parallel to sequential signals after a cyclic prefix is added. Adding the prefix can also be performed after the P/S conversion. In the spread spectrum transmitter, the DSSS sequence is modulated by the information bits or symbols and the modulated signals will undergo pulse-shaping filtering so that the signal spectrum meets specified criteria.

A digital attenuator (G1) is used for the DSSS signal to adjust its transmitted signal level relative to the MC signal. The two signals are overlaid in the digital domain before converting to a composite analog signal. A second analog variable gain (G2) is used subsequent to the D/A converter 830 to further control the power level of the transmitted signal. When the MC signal is not present, both G1 and G2 will be applied to the DSSS signal to provide sufficient transmission dynamic range. G2 can be realized in multiple circuit stages.

Figure 9:
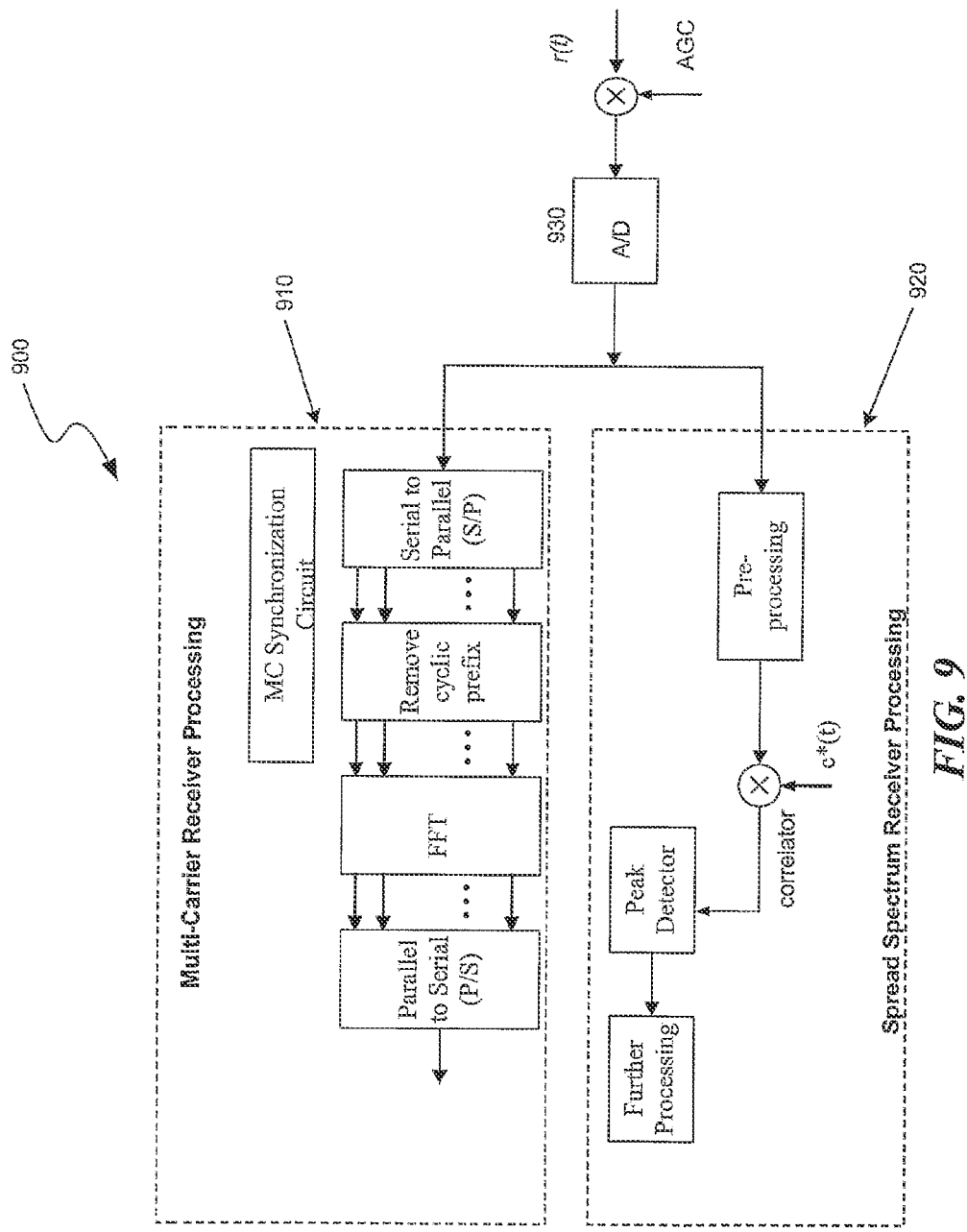
FIG. 9 illustrates a receiver structure of MC and DSSS overlay system.

FIG. 9 illustrates a receiver structure 900 of an MC and DSSS overlay system. A composite signal is processed by a MC receiver 910 and DSSS receiver 920. At the receiver side, after automatic gain control (AGC), an Analog-to-Digital (A/D) converter 930 converts the received analog signal to digital signal. The MC receiver basically performs a reverse process of the MC transmitter. The MC synchronization circuit carries out the synchronization in both time and frequency for the receiver to function properly. The outputs of the P/S are information bits or symbols. To detect whether a DSSS signal is present, the signal is despread with a matched filter or a correlator, using the access sequence, to check if the correlation peak exceeds a predefined threshold. The information from the DSSS receiver 920 will then be used to decode the mobile station's signature in the case of initial random access; to derive the channel information in the case of channel probing; or to decode the information bit in the case of short messaging.

In one embodiment a rake receiver is used in the DSSS receiver 920 to improve its performance in a multi-path environment. In another embodiment, the MC signal is processed as if no DSSS signal is present. In yet another embodiment, advanced interference cancellation techniques can be applied to the composite signal to cancel the DSSS signal from the composite signal thus maintaining almost the same MC performance.

The transmitted composite signal for user i can be represented by:

$$s_i(t)=G_{i,2}*[G_{i,1}*s_{i,SS}(t)+b_i*s_{i,MC}(t)] \quad (1)$$

where bi is 0 when there is no MC signal and is 1 when an MC signal is present. Similarly, $G_{i,1}$ is 0 when there is no DSSS signal and varies depending on the power setting of the DSSS signal relative to the MC signal when a DSSS signal is present. $G_{i,2}$ is used to control the total transmission power for user i. The received signal can be represented by:

$$r(t) = \sum_{i=1}^{M} s_i(t) + N + I \quad (2)$$

where M is the total number of mobile station actively communicating with the current base station, N is the Gaussian noise, and I is the total interference from all the mobile stations in current and other base stations.

Denoting the received power of the MC signal as $P_{MC}$ and the received power of the DSSS signal as $P_{SS}$, the signal to interference and noise ratio (SINR) for the MC signal is:

$$SINR_{MC}=P_{MC}/(N+I) \quad (3)$$

when the DSSS signal is not present; and is $$SINR'_{MC}=P_{MC}/(N+I+P_{SS}) \quad (4)$$

when the DSSS signal is present. The system is designed such that the $SINR'_{MC}$ meets the SINR requirement for the MC signal and its performance is not compromised in spite of interference from the overlaid DSSS signal.

In one embodiment, the DSSS signal is power controlled such that $P_{SS}$ is well below the noise level, N.

On the other hand, the SINR for the DSSS signal is $$SINR_{SS}=P_{SS}/(N+I+P_{MC}) \quad (5)$$

Denoting the spreading factor for the DSSS signal as $K_{SF}$, the effective SINR for one symbol after despreading is:

$$SINR'_{SS}=P_{SS}*K_{SF}/(N+I+P_{MC}) \quad (6)$$

$SINR'_{SS}$ must be high enough to meet the performance requirement when detecting or decoding the information conveyed in the DSSS signal. In one embodiment, $K_{SF}$ is chosen to be 1000, so that the DSSS signal is boosted with 30 dB spreading gain after despreading.

Figure 11:
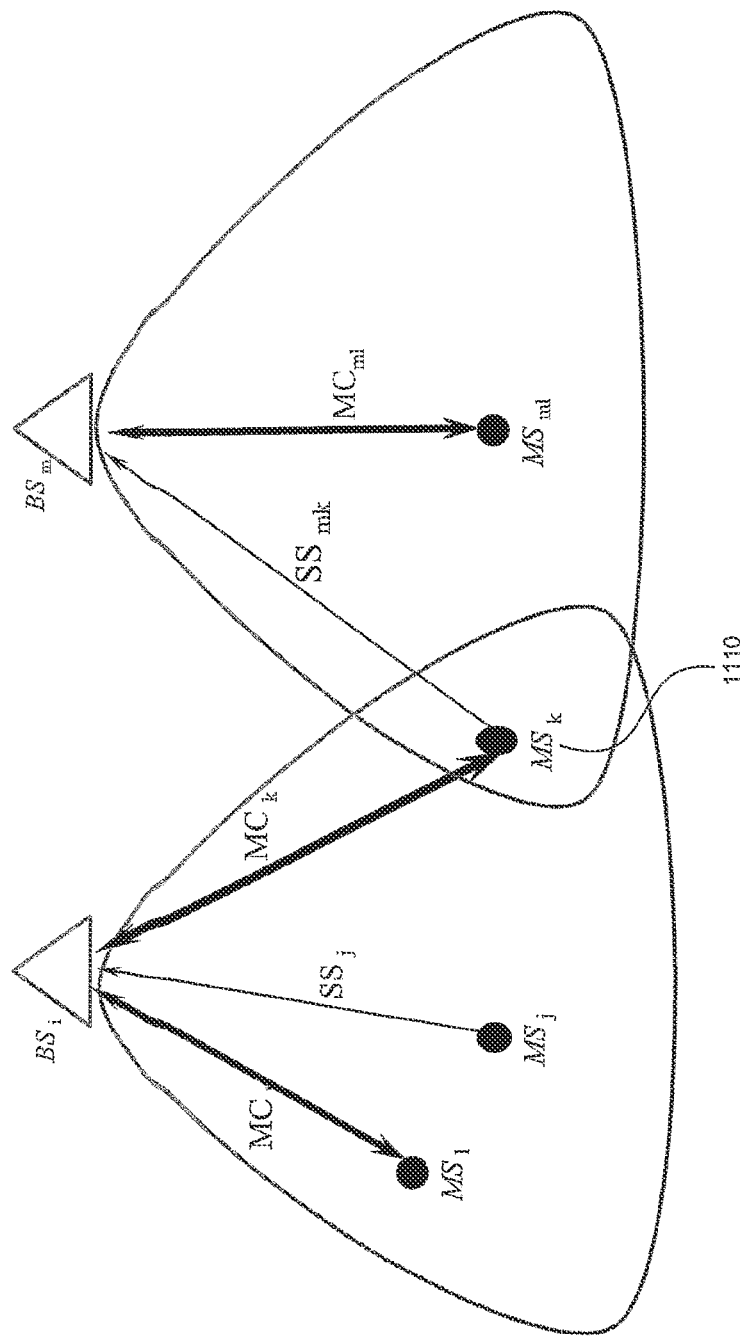
FIG. 11 illustrates a mobile station sending DSSS signals to its current serving base station, or other base stations.

FIG. 11 illustrates a mobile station 1110 sending DSSS signals to its current serving base station or other base stations. The latter case is especially helpful in hand-off processes. In this Figure, a mobile station $MS_k$ is communicating with a $BS_j$ using an MC signal while transmitting a DSSS signal to $BS_k$.

Power Control

As discussed above, one design issue is to minimize the power of the DSSS signal to reduce its interference with the MC data signal. In one embodiment, the initial power setting of a mobile station, $T_{MS\_tx}$ (in dBm), is set based on path loss, $L_{path}$ (in dB), and the desired received power level at the base station, $P_{BS\_rx\_des}$ (in dBm), $$T_{MS\_tx}=P_{BS\_rx\_des}+L_{path}-C_1-C_2 \quad (7)$$

$C_1$ (in dB) is set to a proper value so that the SINR of the MC as specified in equation (4) meets its requirement. $C_2$ (in dB) is an adjustment to compensate for the power control inaccuracy. Open loop power control inaccuracy is mainly caused by a discrepancy between an estimated path loss by the mobile station and the actual path loss.

In one embodiment, $C_1$ is set to 9 dB for MC using QPSK modulation with ½ error control coding or 15 dB for MC using 16QAM modulation with ½ error control coding. $C_2$ is set to 10 dB or 2 dB depending on whether the mobile station is under open loop power control or closed loop power control. Power control for the DSSS signal also eases the spectrum mask requirement for the DSSS signal because the DSSS signal level is much lower than that of the MC signal.

With total power offset of $C_1+C_2$ subtracted from an initial transmission power of the DSSS signal, the spreading factor of the DSSS signal needs to be set high enough (e.g., 512 (27 dB) or higher) so that the DSSS signal can be detected in normal conditions. This requires a sufficient number of bits of the A/D converter at the base station, for example, 12 bits.

In one embodiment, the D/A converter at the mobile station uses 12 bits, among which 8 bits are targeted for the MC signal (assuming 3 bits are reserved for MC peak to average consideration). Thus, there are enough bits left for the DSSS signal even with significant attenuation relative to the MC signal.

Canceling the Interference of DSSS Signal to the MC Signal

Figure 12:
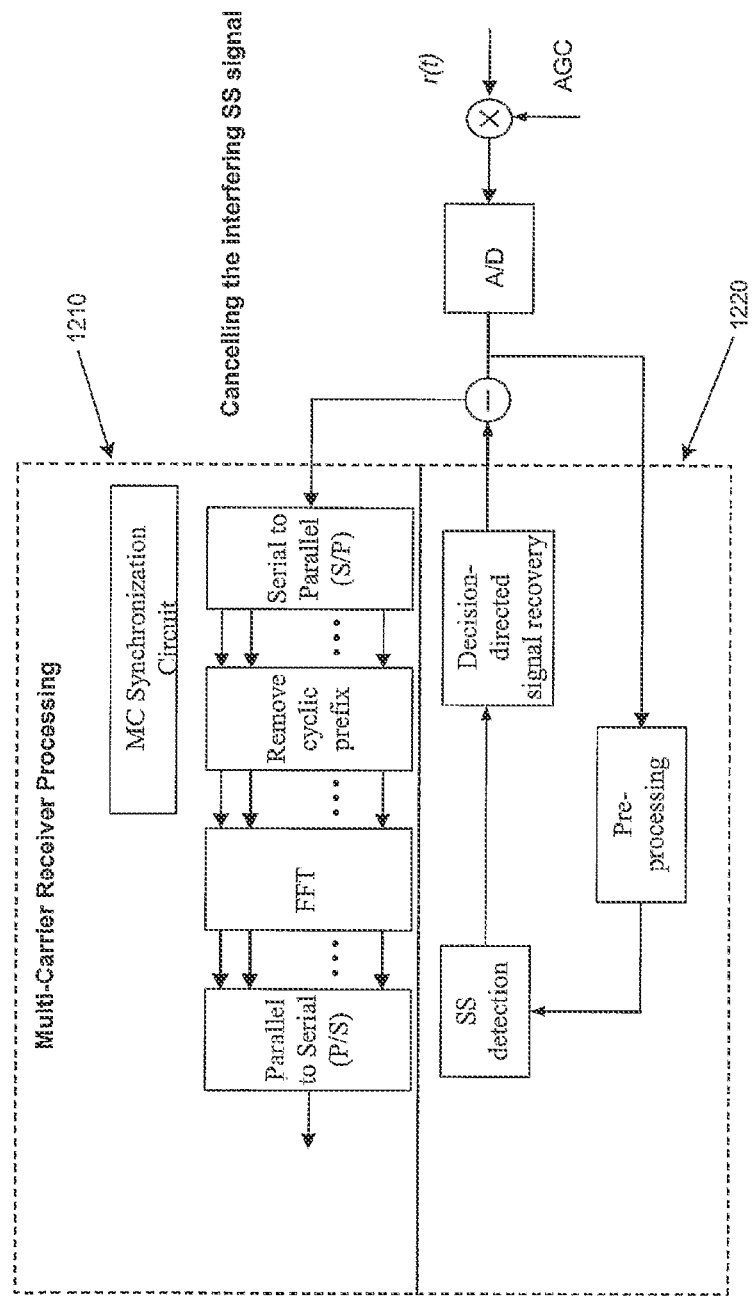
FIG. 12 illustrates using interference cancellation technique to cancel interfering DSSS signal in a composite signal to obtain a clearer MC signal.

In one embodiment, the base station employs interference cancellation techniques to cancel the DSSS interference to the MC signal. FIG. 12 illustrates a system for using an interference cancellation technique to cancel an interfering DSSS signal in a composite signal to obtain a clearer MC signal. First, a DSSS signal is detected by the DSSS receiver 1220; then it is subtracted (decision directed) from the total received signal to obtain a cleaner MC data signal in the MC receiver 1210, as illustrated in FIG. 12. In another embodiment, multiple step iterative cancellation can be applied to further improve the effectiveness of the interference cancellation. The MC receiver basically performs a reverse process of the MC transmitter mentioned above. The MC synchronization circuit carries out the synchronization in both time and frequency for the receiver to function properly. The outputs of the P/S are information bits or symbols.

DSSS Signal Design

DSSS sequences are chosen to have good autocorrelation and cross-correlation properties (i.e., with high peak to sidelobe ratio). In one embodiment, pulse-shaping is applied to restrict the spectrum mask of DSSS signals and to reduce impacts on the MC signals in the frequency domain. For example, the transmitter pulse-shaping filter applied to the DSSS signal can be a root-raised cosine (RRC) with roll-off factor $\alpha$ in the frequency domain. The impulse response of the chip impulse filter $RC_0(t)$ is $$RC_0(t) = \frac{\sin\left(\pi \frac{t}{T_C}(1-\alpha)\right) + 4\alpha \frac{t}{T_C}\cos\left(\pi \frac{t}{T_C}(1+\alpha)\right)}{\pi \frac{t}{T_C}\left(1-\left(4\alpha \frac{t}{T_C}\right)^2\right)} \quad (8)$$

where $T_c$ is the chip duration.

Figure 13:
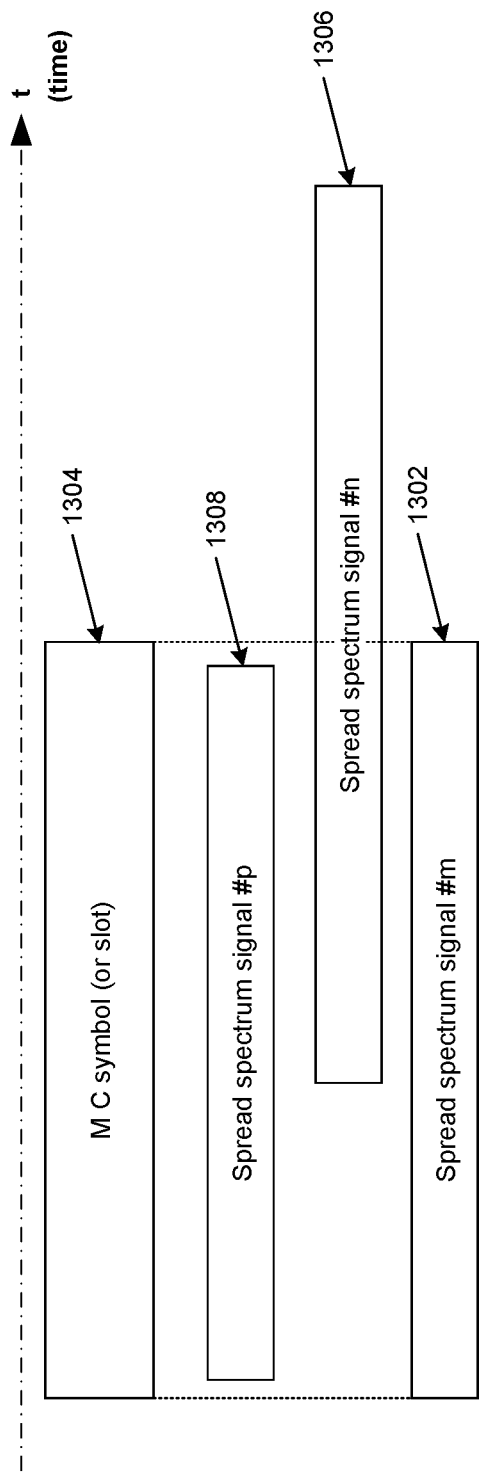
FIG. 13 illustrates a DSSS signal and a MC signal fully overlaid or partially overlaid at MC symbol or slot boundary in time domain.

FIG. 13 illustrates a DSSS signal and a MC signal fully overlaid or partially overlaid with an MC symbol or slot boundary in the time domain. The DSSS and the MC signals may be aligned at the symbol (or slot) boundary when they are synchronized, or partially overlapped in the time domain when they are not synchronized, as shown in FIG. 13, where a DSSS signal #m 1302 fully overlaps with a MC symbol (or slot) 1304 in time domain, while a DSSS signal #n 1306 overlaps with the MC symbol (or slot) only partially.

Figure 14:
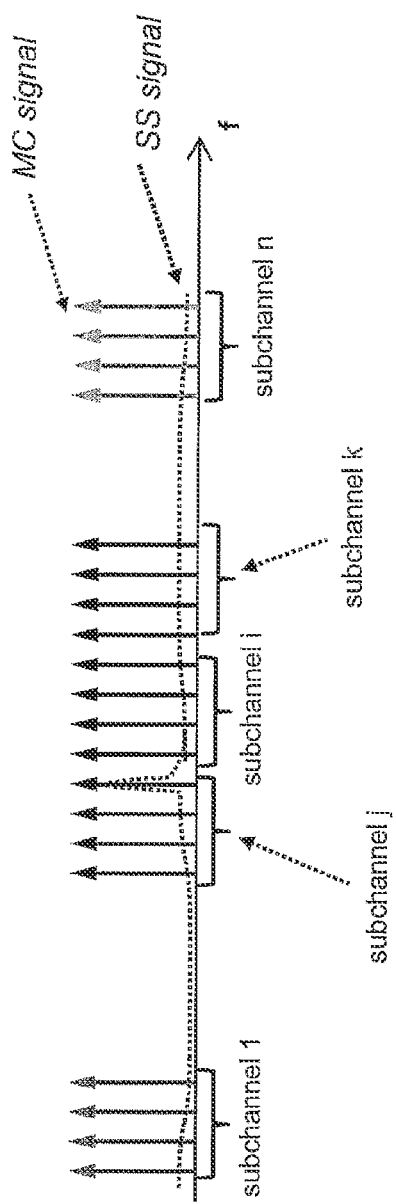
FIG. 14 illustrates a DSSS signal with a high Peak to Average Ratio in frequency domain causing strong interference to certain MC subcarriers.

FIG. 14 illustrates a DSSS signal with a high Peak to Average Ratio in the frequency domain causing strong interference to certain MC subcarriers. The sequence used to spread the DSSS signal has to be designed to avoid cases where the DSSS signal may have a high Peak to Average ratio (PAR) in the frequency domain and its spikes may cause severe interference with some MC subcarriers, as illustrated in FIG. 14. In one embodiment, the DSSS sequence is designed so that, in partial or in full, it has low PAR in the frequency domain using signal processing techniques, such as a PAR reduction algorithm. Either binary or non binary sequences can be used.

In another embodiment, Golay complementary sequences, Reed-Muller codes, or the codes designed with similar construction methods may be used to control the PAR of DSSS sequences in the frequency domain, thereby limiting the interference of DSSS signals to MC signals, which are demodulated in the frequency domain. In one embodiment, guard periods are added to the DSSS signal which overlaps with one MC symbol, as shown by DSSS signal #p 1308 in FIG. 13. The guard periods ensure that a well-designed DSSS sequence (with low PAR in frequency domain) causes little interference with the MC subcarriers even when there is time misalignment in a DSSS signal relative to the OFDM symbol period.

Within MC subcarriers, the control subcarriers are more important than the data subcarriers and may need to have a better protection in the overlay system.

Figure 15:
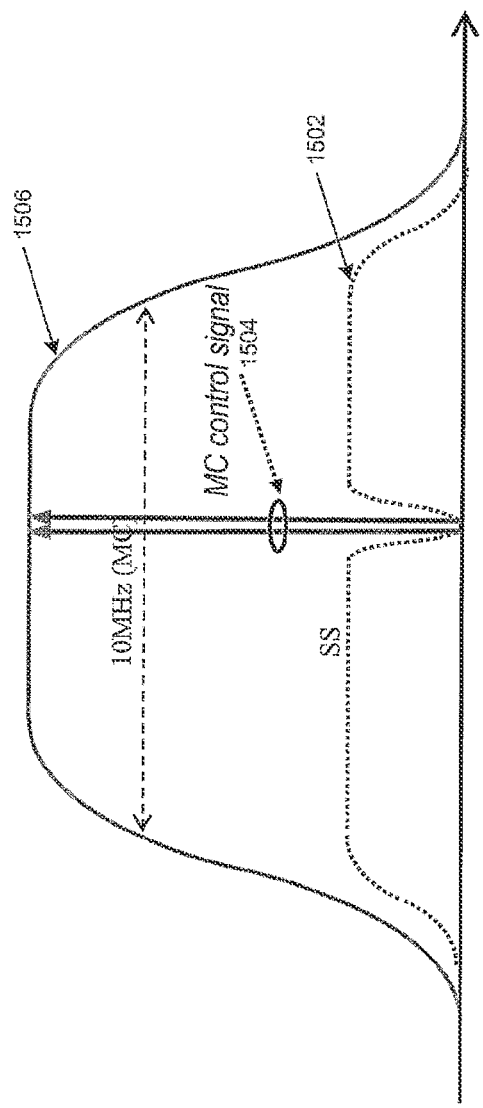
FIG. 15 illustrates using spectrum nulls in DSSS signal to protect an MC control subchannel.
Figure 16:
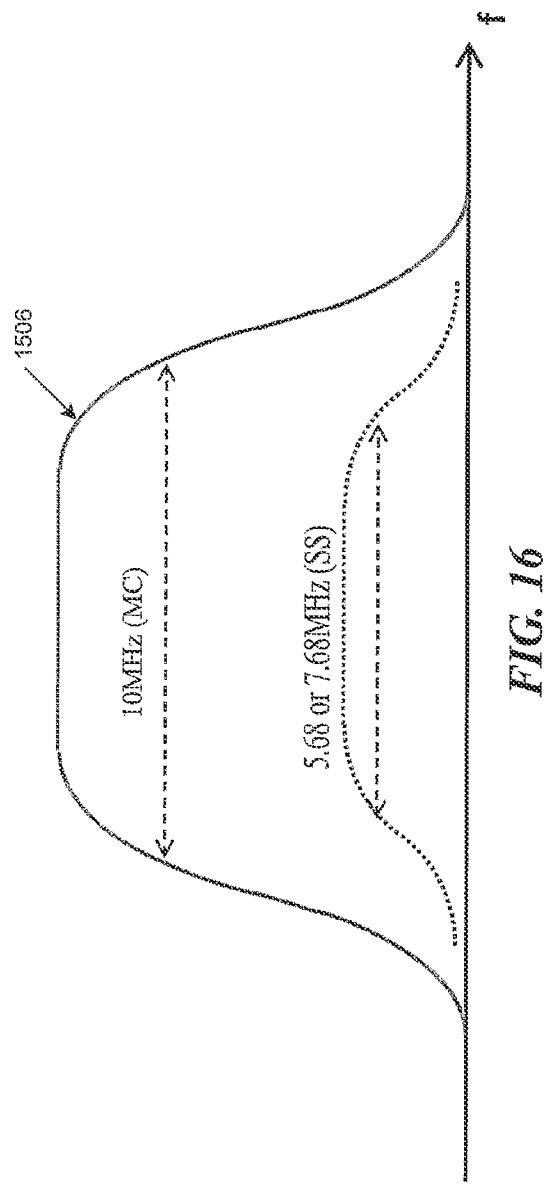
FIG. 16 illustrates spectrum control for DSSS signal using simple sub-sampling method.

FIG. 15 illustrates using spectrum nulls in the DSSS signal 1502 to protect an MC control subchannel. In one embodiment, the DSSS sequence is designed to have spectrum nulls at MC control subchannels to avoid excess interference with the uplink MC control signals 1504, as illustrated in FIG. 15. One such scheme is to use sub-sampling such that the chip rate of the DSSS signal is ½ or ⅔ of the system sampling rate, which means the DSSS spectrum will only occupy the center portion with a width of 5.76 MHz or 7.68 MHz out of the 10 MHz available spectrum 1506, as shown in FIG. 16. Its interference with the MC sub-carriers over the rest of the spectrum will be much lower where the MC subchannels, carrying control information or using higher modulation subcarriers (such as 16QAM), are placed.

Initial Random Access Using the Overlay Scheme

Figure 10:
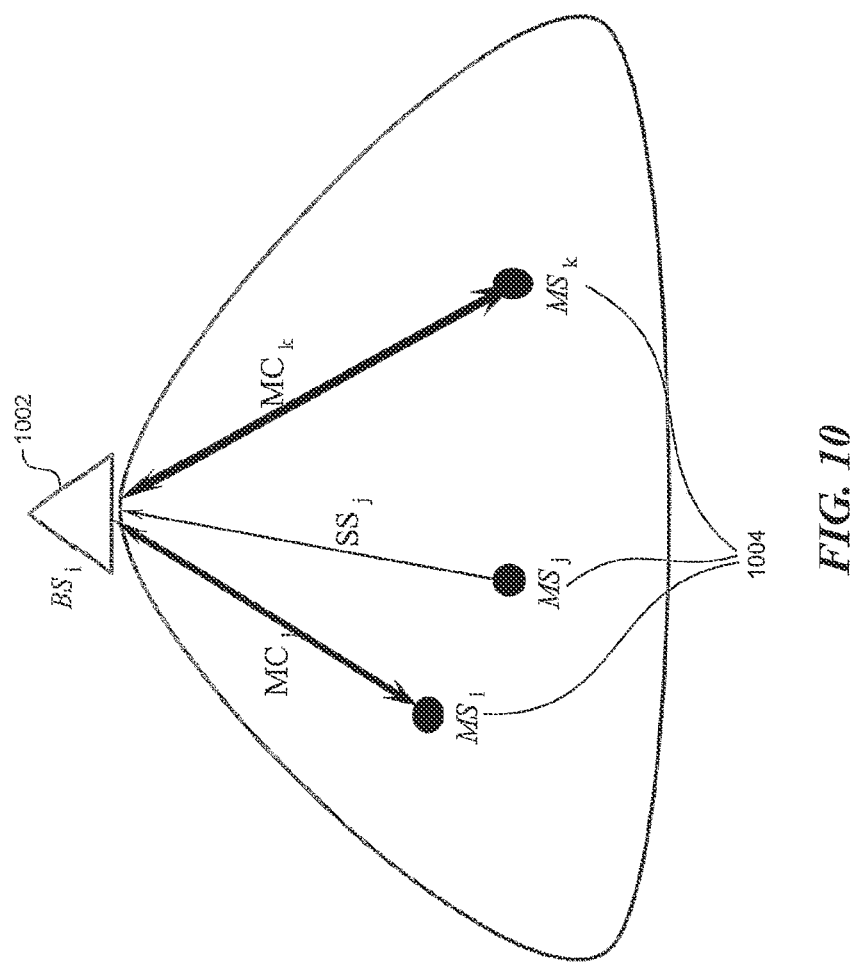
FIG. 10 illustrates examples of communications between a base station and multiple mobile stations transmitting DSSS and MC signals.

FIG. 10 illustrates a DSSS signal used as initial random access by the mobile station $MS_j$ 1004, in an overlay system. In the mean time, $MS_1$ and $MS_k$ are transmitting MC signals to the base station $BS_i$ 1002. In one embodiment of the invention, the DSSS signal is used for initial random access and the MC signal is used by multiple mobile stations to transmit high rate data and related control information, as illustrated in FIG. 10. In this arrangement the mobile station $MS_j$ is transmitting its initial access DSSS signal simultaneously with the MC signals from other mobile stations (in this case, $MS_1$ and $MS_K$) to the base station $BS_i$.

In the initial random access of a multi-carrier multiple access system, a mobile station cannot transmit directly onto the control subchannel because its transmission time and power have not been aligned with other mobile stations. When this mobile station powers up or wakes up from a sleep mode, it first listens to a base station broadcasting channel and finds an available random access DSSS channel. It then sends an initial random access signal over the DSSS channel with a certain signature code or sequence that is designated to the corresponding base station and is broadcasted to all the mobile stations by each base station.

The initial access DSSS signal arrives at the base station together with MC signals from other mobile stations, each carrying data and control information. The initial power level of the DSSS signal is based on the open power loop control settings. A sufficient guard period is reserved in the DSSS signal to account for initial time alignment uncertainty, as shown in FIG. 5.

If the base station successfully detects the DSSS signal, it sends the acknowledgement (ACK) carrying information such as a signature or other unique mobile station identifier and power and time adjustments of the mobile on the downlink control channel in the next available timeslot. The mobile station whose transmission signature matches that of the acknowledgement then moves to the designated uplink MC control channel using the assigned time and power values and further completes the message transmission.

If no feedback is received at the mobile station after a pre-defined number of slots, it assumes that the access slot was not detected by the base station, and will ramp up the transmission power of the DSSS signal by one step and re-transmit it, until it reaches the maximum allowable transmit signal power or the maximum retry times. In one embodiment, the power ramping step of the mobile station is set to be 1 dB or 2 dB which is configured by the base station on the downlink broadcasting channel. The maximum allowable transmit signal power and the retry times are also controlled by the base station depending on the uplink modulation/coding scheme and available access channels. During the initial random access, the DSSS signal can also be used for channel probing and short messaging.

Channel Probing Using DSSS in the Overlay System

In one embodiment of the invention, the DSSS signal is used to assist estimation of channel characteristics. In this case, the mobile station is already synchronized in time and frequency with the base station, and its transmission of the MC signal is under closed-loop power control with the base station.

Figure 17:
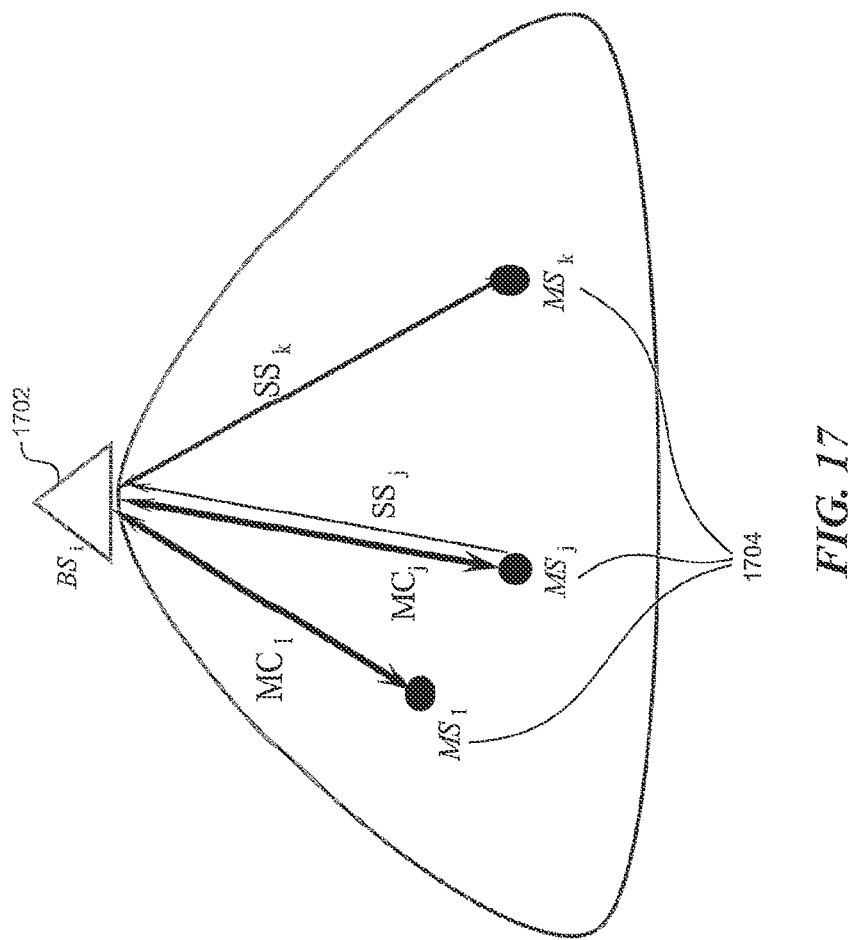
FIG. 17 illustrates examples of communications between a base station and multiple mobile stations transmitting both DSSS and MC signals.

FIG. 17 illustrates examples of communications between a base station 1702 and multiple mobile stations 1704 transmitting both DSSS and MC signals. DSSS signal is used for channel probing or to carry short messages. In this case, $MS_j$ 1704 is transmitting both an MC signal and a DSSS signal to the base station $BS_i$ 1702. It is also under closed loop power control with the base station $BS_i$ 1702. In FIG. 17, the mobile station $MS_j$ 1704 is transmitting its DSSS signal simultaneously with its own MC signal. Other mobile stations (in this case, $MS_1$ 1704 and $MS_K$ 1704) are transmitting either MC or DSSS signals to the base station $BS_i$ 1702.

Figure 18:
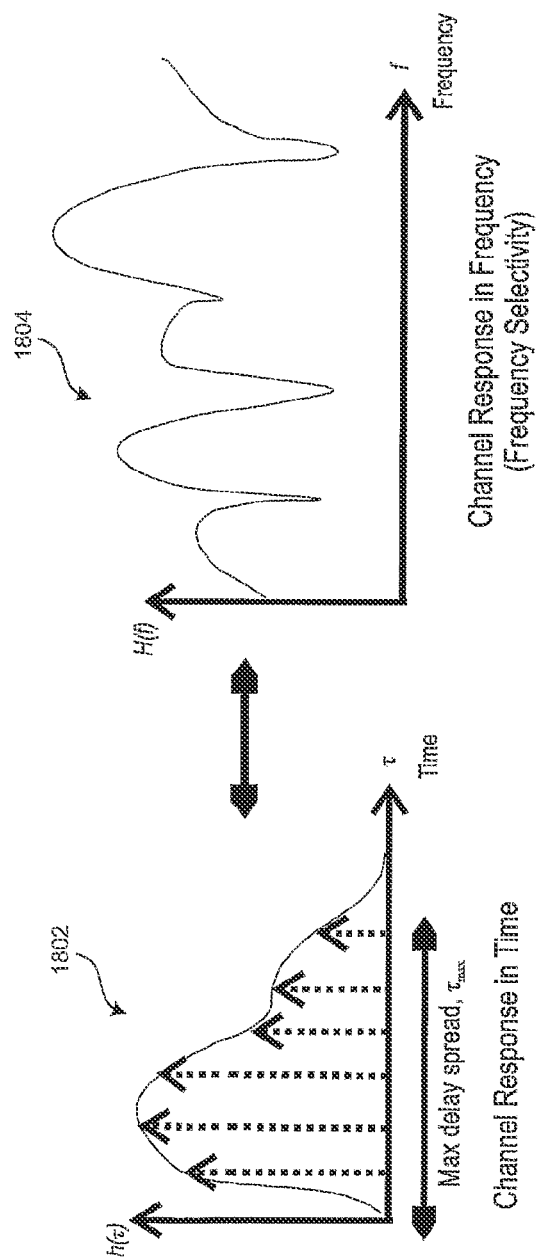
FIG. 18 illustrates a typical channel response in the time and frequency domains. By estimating the peaks of a channel response in the time domain, the channel profile in the frequency domain can be obtained.

FIG. 18 illustrates a typical channel response in the time domain 1802 and the frequency domain 1804. By estimating the peaks of a channel response in the time domain 1802, the channel profile in the frequency domain 1804 can be obtained. A typical channel response in the time domain and frequency domain for a broadband wireless system is shown in FIG. 18. Using a matched filter in the DSSS receiver at the base station, the peaks of a channel response in time can be detected.

When closed loop power control is used, the initial power settings will be much more accurate than by using open loop power control alone. Thus, the margin reserved for power control inaccuracy can be reduced to a much smaller value. Furthermore, a bigger spreading factor can be used since no data information needs to be conveyed in the DSSS signal. This leaves a dynamic range large enough for detecting multi-path peaks from the output of the match filter or correlator, thereby generating a better channel profile. When and how often a mobile station should send the DSSS signal for channel probing is configurable by the network or the mobile station.

In one embodiment, the base station dictates the mobile station to transmit the channel probing DSSS when it needs an update of the mobile station's channel characteristics. In another embodiment, the base station polls the mobile station during its silent period and gets an update of the mobile station's information such as transmission timing and power from the probing DSSS signal. In yet another embodiment, the channel profile information is used by the base station to determine the proper modulation/coding and pilot pattern. In yet another embodiment, the channel profile information is used for advanced antenna techniques such as beamforming. In one embodiment, channel probing with the DSSS signaling is performed without close loop power control or time synchronization.

Short Message Using DSSS in the Overlay System

In one embodiment of the invention, the DSSS signal is used to carry short messages. In this case, the mobile station is already synchronized in time and frequency with the base station, and its transmission of a MC signal is also under closed-loop power control with the base station. As shown in FIG. 17, the mobile station $MS_j$ is transmitting its DSSS signal carrying a short message simultaneously with its own MC signal. Other mobile stations (in this case, $MS_1$ and $MS_K$) are transmitting either the MC signal or DSSS signal to the base station $BS_i$. In this case, the short message carried by the DSSS signal has a much lower data rate compared with that of the MC signal. In another embodiment, short messaging using the DSSS signaling is performed without close loop power control or time synchronization.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention under the claims.

While certain aspects of the invention are presented below in certain claim forms, the inventors contemplate the various aspects of the invention in any number of claim forms. Accordingly, the inventors reserve the right to add additional claims after filing the application to pursue such additional claim forms for other aspects of the invention.

What is claimed is:

1. A mobile station comprising:
a transmitter; and
a receiver, wherein
the transmitter and the receiver are configured to:
operate in an orthogonal frequency division multiplexing (OFDM) communication system using a spectral band in a frequency domain and frames in a time domain, the spectral band having a plurality of subcarriers, the frames having time units and each time unit having a plurality of OFDM symbols, wherein the mobile station is synchronized in time with a base station of the OFDM communication system based on a random access signal; and
the transmitter is configured to:
produce a non-random access signal by spreading in the time domain, and not spreading in the frequency domain, using an orthogonal sequence, wherein the non-random access signal conveys at least one information bit; and
transmit, to a base station, the non-random access signal during a plurality of the OFDM symbols using a portion of the spectral band, wherein the non-random access signal overlays at least one other signal transmitted by at least another mobile station of the OFDM communication system in the time domain, for at least a portion of an OFDM symbol period, and in the frequency domain, in the portion of the spectral band, wherein the non-random access signal is time aligned with the plurality of the OFDM symbols based on the time synchronization.

2. The mobile station of claim 1, wherein the at least one other signal is not spread in the time domain.

3. The mobile station of claim 1, wherein the non-random access signal overlays a second signal transmitted by one of the at least another mobile station of the OFDM communication system in the portion of the spectral band, wherein the second signal is spread in the time domain using a second orthogonal sequence.

4. The mobile station of claim 1, wherein an OFDM signal is transmitted by another mobile station of the OFDM communication system in another portion of the spectral band during the at least one of the plurality of OFDM symbols.

5. The mobile station of claim 1, wherein the transmitter is further configured to transmit a second signal in another portion of the spectral band during the at least one of the plurality of OFDM symbols.

6. The mobile station of claim 5, wherein a transmission power level of the non-random access signal having the at least one information bit is transmitted at a lower power level than the second signal.

7. The mobile station of claim 5, wherein the non-random access signal having the at least one information bit has a lower data rate than the second signal.

8. The mobile station of claim 1, wherein the non-random access signal overlays the at least one other signal in the time domain for a plurality of OFDM symbol periods.

9. The mobile station of claim 1, wherein the spectral band includes an outer portion and a center portion, wherein the portion of the spectral band for transmitting the non-random access signal is in the outer portion.

10. The mobile station of claim 1, wherein each frame has subframes, each subframe having two or more time units.

11. The mobile station of claim 1, wherein the plurality of subcarriers includes data subcarriers for carrying data signals and pilot subcarriers for carrying pilot signals.

12. The mobile station of claim 1, wherein the frames are time division duplex frames, each TDD frame including at least one uplink time unit, at least one downlink time unit and at least one special period, the special period serving as a transition time between an uplink time unit and a downlink time unit.

13. The mobile station of claim 1, wherein the transmitter is further configured to transmit, to the base station, a second signal at a same time as the transmission of the non-random access signal, wherein the second signal is transmitted using at least one of the plurality of the subcarriers and at least one of the time units.

14. The mobile station of claim 13, wherein a power level of the transmission of the second signal is different from a power level of the transmission of the non-random access signal.

15. The mobile station of claim 13, wherein a power level of the transmission of the second signal is determined using open loop power control.

16. The mobile station of claim 1, wherein the receiver is further configured to receive, from the base station, a poll message, wherein the non-random access signal is transmitted in response to the received poll message.

17. The mobile station of claim 1, wherein the transmitter is further configured to:
transmit, to the base station, the random access signal followed by a guard period in only a portion of the spectral band, wherein the random access signal includes a second sequence associated with the base station, wherein a time duration of a combination of the random access signal and the guard period is greater than a time duration of at least one of the plurality of OFDM symbols.

18. The mobile station of claim 1, wherein the orthogonal sequence is indicated by the base station.

19. The mobile station of claim 1, wherein the non-random access signal carries a short message.

20. A method performed by a mobile station, the method comprising:
operating in an orthogonal frequency division multiplexing (OFDM) communication system using a spectral band in a frequency domain and frames in a time domain, the spectral band having a plurality of subcarriers, the frames having time units and each time unit having a plurality of OFDM symbols, wherein the mobile station is synchronized in time with a base station of the OFDM communication system based on a random access signal;
producing a non-random access signal by spreading in the time domain, and not spreading in the frequency domain, using an orthogonal sequence, wherein the non-random access signal conveys at least one information bit; and
transmitting, to a base station, the non-random access signal during a plurality of the OFDM symbols using a portion of the spectral band, wherein the non-random access signal overlays at least one other signal transmitted by at least another mobile station of the OFDM communication system in the time domain, for at least a portion of an OFDM symbol period, and in the frequency domain, in the portion of the spectral band, wherein the non-random access signal is time aligned with the plurality of the OFDM symbols based on the time synchronization.

21. The method of claim 20, wherein the at least one other signal is not spread in the time domain.

22. The method of claim 20, wherein the non-random access signal overlays a second signal transmitted by one of the at least another mobile station of the OFDM communication system in the portion of the spectral band, wherein the second signal is spread in the time domain using a second orthogonal sequence.

23. The method of claim 20, wherein an OFDM signal is transmitted by another mobile station of the OFDM communication system in another portion of the spectral band during the at least one of the plurality of OFDM symbols.

24. The method of claim 20, further comprising:
transmitting a second signal in another portion of the spectral band during the at least one of the plurality of OFDM symbols.

25. The method of claim 24, wherein a transmission power level of the non-random access signal having the at least one information bit is transmitted at a lower power level than the second signal.

26. The method of claim 24, wherein the non-random access signal having the at least one information bit has a lower data rate than the second signal.

27. The method of claim 20, wherein the non-random access signal overlays the at least one other signal in the time domain for a plurality of OFDM symbol periods.

28. The method of claim 20, wherein the spectral band includes an outer portion and a center portion, wherein the portion of the spectral band for transmitting the non-random access signal is in the outer portion.

29. The method of claim 20, wherein each frame has subframes, each subframe having two or more time units.

30. The method of claim 20, wherein the plurality of subcarriers includes data subcarriers for carrying data signals and pilot subcarriers for carrying pilot signals.

31. The method of claim 20, wherein the frames are time division duplex frames, each TDD frame including at least one uplink time unit, at least one downlink time unit and at least one special period, the special period serving as a transition time between an uplink time unit and a downlink time unit.

32. The method of claim 20, further comprising:
transmitting, to the base station, a second signal at a same time as the transmission of the non-random access signal, wherein the second signal is transmitted using at least one of the plurality of the subcarriers and at least one of the time units.

33. The method of claim 32, wherein a power level of the transmission of the second signal is different from a power level of the transmission of the non- random access signal.

34. The method of claim 32, wherein a power level of the transmission of the second signal is determined using open loop power control.

35. The method of claim 20, further comprising:
receiving, from the base station, a poll message, wherein the non-random access signal is transmitted in response to the received poll message.

36. The method of claim 20, further comprising:
transmitting, to the base station, the random access signal followed by a guard period in only a portion of the spectral band, wherein the random access signal includes a second sequence associated with the base station, wherein a time duration of a combination of the random access signal and the guard period is greater than a time duration of at least one of the plurality of OFDM symbols.

37. The method of claim 20, wherein the orthogonal sequence is indicated by the base station.

38. The method of claim 20, wherein the non-random access signal carries a short message.

39. A base station comprising:
a transmitter; and
a receiver, wherein
the transmitted and the receiver are configured to:
operate in an orthogonal frequency division multiplexing (OFDM) communication system using a spectral band in a frequency domain and frames in a time domain, the spectral band having a plurality of subcarriers, the frames having time units and each time unit having a plurality of OFDM symbols; and
the receiver is configured to receive a plurality of signals from mobile stations during a plurality of the OFDM symbols in a portion of the spectral band, wherein the plurality of the signals are overlaid in the time domain, for at least a portion of an OFDM symbol period, and in the frequency domain, in the portion of the spectral band, and at least one of the plurality of signals is non-random access that is spread in the time domain, and not spread in the frequency domain, using an orthogonal sequence, and the non-random access signal conveys at least one information bit, wherein the non-random access signal is received from a first mobile station time synchronized with the base station based on a time adjustment transmitted by the base station in response to a random access signal received from the first mobile station and the non-random access signal is time aligned with the plurality of the OFDM symbols based on the time synchronization.

40. The base station of claim 39, wherein the plurality of signals includes a signal that is not spread in the time domain.

41. The base station of claim 39, wherein the receiver is further configured to:
receive a second signal from a mobile station in another portion of the spectral band during the plurality of OFDM symbols.

42. The base station of claim 41, wherein the non-random access signal having the at least one information bit has a lower data rate than the second signal.

43. The base station of claim 41, wherein the non-random access signal has a lower transmission power level than the second signal.

44. The base station of claim 39, wherein the plurality of signals are overlaid in the time domain for a plurality of OFDM symbol periods.

45. The base station of claim 39, wherein the spectral band includes an outer portion and a center portion, wherein the portion of the spectral band for receiving the plurality of signals is in the outer portion.

46. The base station of claim 39, wherein each frame has subframes, each subframe having two or more time units.

47. The base station of claim 39, wherein the plurality of subcarriers includes data subcarriers for carrying data signals and pilot subcarriers for carrying pilot signals.

48. The base station of claim 39, wherein the frames are time division duplex frames, each TDD frame including at least one uplink time unit, at least one downlink time unit and at least one special period, the special period serving as a transition time between an uplink time unit and a downlink time unit.

49. The base station of claim 39, wherein the transmitter is further configured to:
transmit, to at least one of plurality of the mobile stations, a poll message.

50. The base station of claim 39, wherein the receiver is further configured to:
receive, from the first mobile station, the random access signal followed by a guard period in only a portion of the spectral band, wherein the random access signal includes a second sequence associated with the base station, wherein a time duration of a combination of the random access signal and the guard period is greater than a time duration of at least one of the plurality of OFDM symbols.

51. The base station of claim 39, wherein the base station indicates the orthogonal sequence to the mobile station.

52. The base station of claim 39, wherein the non-random access signal carries a short message.

53. A method performed by a base station, the method comprising:
operating in an orthogonal frequency division multiplexing (OFDM) communication system using a spectral band in a frequency domain and frames in a time domain, the spectral band having a plurality of subcarriers, the frames having time units and each time unit having a plurality of OFDM symbols; and
receiving a plurality of signals from mobile stations during a plurality of the OFDM symbols in a portion of the spectral band, wherein the plurality of the signals are overlaid in the time domain, for at least a portion of an OFDM symbol period, and in the frequency domain, in the portion of the spectral band, and at least one of the plurality of signals is a non-random access signal that is spread in the time domain, and not spread in the frequency domain, using an orthogonal sequence and the non-random access signal conveys at least one information bit, wherein the non-random access signal is received from a first mobile station time synchronized with the base station based on a time adjustment transmitted by the base station in response to a random access signal received from the first mobile station and the non-random access signal is time aligned with the plurality of the OFDM symbols based on the time synchronization.

54. The method of claim 53, wherein the plurality of signals includes a signal that is not spread in the time domain.

55. The method of claim 53, further comprising:
receiving a second signal from a mobile station in another portion of the spectral band during the plurality of OFDM symbols.

56. The method of claim 55, wherein the non-random access signal having the at least one information bit has a lower data rate than the second signal.

57. The method of claim 55, wherein the non-random access signal has a lower transmission power level than the second signal.

58. The method of claim 53, wherein the plurality of signals are overlaid in the time domain for a plurality of OFDM symbol periods.

59. The method of claim 53, wherein the spectral band includes an outer portion and a center portion, wherein the portion of the spectral band for receiving the plurality of signals is in the outer portion.

60. The method of claim 53, wherein each frame has subframes, each subframe having two or more time units.

61. The method of claim 53, wherein the plurality of subcarriers includes data subcarriers for carrying data signals and pilot subcarriers for carrying pilot signals.

62. The method of claim 53, wherein the frames are time division duplex frames, each TDD frame including at least one uplink time unit, at least one downlink time unit and at least one special period, the special period serving as a transition time between an uplink time unit and a downlink time unit.

63. The method of claim 53, further comprising:
transmitting, to at least one of plurality of the mobile stations, a poll message.

64. The method of claim 53, further comprising:
receiving, from the first mobile station, the random access signal followed by a guard period in only a portion of the spectral band, wherein the random access signal includes a second sequence associated with the base station, wherein a time duration of a combination of the random access signal and the guard period is greater than a time duration of at least one of the plurality of OFDM symbols.

65. The method of claim 53, wherein the base station indicates the orthogonal sequence to the mobile station.

66. The method of claim 53, wherein the non-random access signal carries a short message.

67. An orthogonal frequency division multiplexing (OFDM) wireless system comprising:
a base station; and
a plurality of mobile stations including a first mobile station, wherein the base station and the plurality of mobile stations are configured to operate using a spectral band in a frequency domain and frames in a time domain, the spectral band having a plurality of subcarriers, the frames having time units and each time unit having a plurality of OFDM symbols, wherein the first mobile station is synchronized in time with the base station based on a time adjustment transmitted by the base station to the first mobile station in response to a random access signal received by the base station from the first mobile station;
the first mobile station comprising:
a first mobile station transmitter configured to:
produce a non-random access signal by spreading in the time domain, and not spreading in the frequency domain, using an orthogonal sequence, wherein the non-random access signal conveys at least one information bit; and
transmit the non-random access signal during a plurality of the OFDM symbols using a portion of the spectral band; and the base station comprising:
a base station receiver configured to:
receive a plurality of signals from the plurality of mobile stations during the plurality of the OFDM symbols in the portion of the spectral band, wherein the plurality of the signals includes the non-random access signal transmitted by the first mobile station, wherein the plurality of the signals are overlaid in the time domain, for at least a portion of an OFDM symbol period, and in the frequency domain, in the portion of the spectral band, and wherein the non-random access signal is time aligned with the plurality of the OFDM symbols based on the time synchronization.

68. The OFDM wireless system of claim 67, wherein the plurality of the signals includes at least one signal that is not spread in the time domain.

69. The OFDM wireless system of claim 67, wherein the base station receiver is further configured to:
receive a second signal from a second mobile station in another portion of the spectral band during the plurality of OFDM symbols.

70. The OFDM wireless system of claim 67, wherein:
the first mobile station transmitter is further configured to:
transmit a second signal in another portion of the spectral band during the at least one of the plurality of OFDM symbols; and
the base station receiver is further configured to:
receive the second signal in the another portion of the spectral band during the plurality of OFDM symbols.

71. The OFDM wireless system of claim 70, wherein a power level of the transmission of the non-random access signal is lower than a power level of the transmission of the second signal.

72. The OFDM wireless system of claim 70, wherein the non-random access signal has a lower data rate than the second signal.

73. OFDM wireless system of claim 67, wherein the spectral band includes an outer portion and a center portion, wherein the portion of the spectral band for transmitting the non-random access signal is in the outer portion.

74. The OFDM wireless system of claim 67, wherein each frame has subframes, each subframe having two or more time units.

75. The OFDM wireless system of claim 67, wherein the plurality of subcarriers includes data subcarriers for carrying data signals and pilot subcarriers for carrying pilot signals.

76. The OFDM wireless system of claim 67, wherein the frames are time division duplex frames, each TDD frame including at least one uplink time unit, at least one downlink time unit and at least one special period, the special period serving as a transition time between an uplink time unit and a downlink time unit.

77. The OFDM wireless system of claim 67, wherein:
the first mobile station transmitter is further configured to:
transmit a second signal at a same time as the transmission of the non- random access signal, wherein the second signal is transmitted using at least one of the plurality of the subcarriers and at least one of the time units; and the base station receiver is further configured to:
receive the second signal using at least one of the plurality of the subcarriers and at least one of the time units.

78. The OFDM wireless system of claim 77, wherein a power level of the transmission of the second signal is different from a power level of the transmission of the non-random access signal.

79. The OFDM wireless system of claim 77, wherein a power level of the transmission of the second signal is determined using open loop power control.

80. The OFDM wireless system of claim 67, wherein:
the base station further comprises a base station transmitter configured to:
transmit a poll message; and
the first mobile station further comprises a first mobile station receiver configured to:
receive the poll message, wherein the non-random access signal is transmitted in response to the received poll message.

81. The OFDM wireless system of claim 67, wherein:
the first mobile station transmitter is further configured to:
transmit the random access signal followed by a guard period in only a portion of the spectral band, wherein the random access signal includes a second sequence associated with the base station, wherein a time duration of a combination of the random access signal and the guard period is greater than a time duration of at least one of the plurality of OFDM symbols; and the base station receiver is further configured to:
receive the random access signal.

82. The OFDM wireless system of claim 67, wherein the orthogonal sequence is indicated to the mobile station by the base station.

83. The OFDM wireless system of claim 67, wherein the non-random access signal carries a short message.

84. A method for use by an orthogonal frequency division multiplexing (OFDM) wireless system comprising a base station and a plurality of mobile stations including a first mobile station, the method comprising:
operating using a spectral band in a frequency domain and frames in a time domain, the spectral band having a plurality of subcarriers, the frames having time units and each time unit having a plurality of OFDM symbols, wherein the first mobile station is synchronized in time with the base station based on a time adjustment transmitted by the base station to the first mobile station in response to a random access signal received by the base station from the first mobile station;
producing, by the first mobile station, a non-random access signal by spreading in the time domain, and not spreading in the frequency domain, using an orthogonal sequence, wherein the non-random access signal conveys at least one information bit; and
transmit, by the first mobile station, the non-random access signal during a plurality of the OFDM symbols using a portion of the spectral band; and
receiving, by the base station, a plurality of signals from a plurality of mobile stations during the plurality of the OFDM symbols in the portion of the spectral band, wherein the plurality of the signals includes the non-random access signal transmitted by the first mobile station, wherein the plurality of the signals are overlaid in the time domain, for at least a portion of an OFDM symbol period, and in the frequency domain, in the portion of the spectral band, and wherein the non-random access signal is time aligned with the plurality of the OFDM symbols based on the time synchronization.

85. The method of claim 84, wherein the plurality of the signals includes at least one signal that is not spread in the time domain.

86. The method of claim 84, further comprising:
receiving, by the base station, a second signal from a second mobile station in another portion of the spectral band during the plurality of OFDM symbols.

87. The method of claim 84, further comprising:
transmitting, by the first mobile station, a second signal in another portion of the spectral band during the at least one of the plurality of OFDM symbols; and
receiving, by the base station, the second signal in the another portion of the spectral band during the plurality of OFDM symbols.

88. The method of claim 87, wherein a power level of the transmission of the non-random access signal is lower than a power level of the transmission of the second signal.

89. The method of claim 87, wherein the non-random access signal has a lower data rate than the second signal.

90. The method of claim 84, wherein the spectral band includes an outer portion and a center portion, wherein the portion of the spectral band for transmitting the non-random access signal is in the outer portion.

91. The method of claim 84, wherein each frame has subframes, each subframe having two or more time units.

92. The method of claim 84, wherein the plurality of subcarriers includes data subcarriers for carrying data signals and pilot subcarriers for carrying pilot signals.

93. The method of claim 84, wherein the frames are time division duplex frames, each TDD frame including at least one uplink time unit, at least one downlink time unit and at least one special period, the special period serving as a transition time between an uplink time unit and a downlink time unit.

94. The method of claim 84, further comprising:
transmitting, by the first mobile station, a second signal at a same time as the transmission of the non-random access signal, wherein the second signal is transmitted using at least one of the plurality of the subcarriers and at least one of the time units; and
receiving, by the base station, the second signal using at least one of the plurality of the subcarriers and at least one of the time units.

95. The method of claim 94, wherein a power level of the transmission of the second signal is different from a power level of the transmission of the non- random access signal.

96. The method of claim 94, wherein a power level of the transmission of the second signal is determined using open loop power control.

97. The method of claim 84, further comprising:
transmitting, by the base station, a poll message; and
receiving, by the first mobile station, the poll message, wherein the non-random access signal is transmitted in response to the received poll message.

98. The method of claim 84, further comprising:
transmitting, by the first mobile station, the random access signal followed by a guard period in only a portion of the spectral band, wherein the random access signal includes a second sequence associated with the base station, wherein a time duration of a combination of the random access signal and the guard period is greater than a time duration of at least one of the plurality of OFDM symbols; and receiving, by the base station, the random access signal.

99. The method of claim 84, wherein the orthogonal sequence is indicated to the mobile station by the base station.

100. The method of claim 84, wherein the non-random access signal carries a short message.

* * * * *